United States Patent
Szommer et al.

(10) Patent No.: US 12,119,685 B2
(45) Date of Patent: Oct. 15, 2024

(54) CONTROL DEVICE AND ELECTRIC POWER TOOL SYSTEM

(71) Applicant: Positec Power Tools (Suzhou) Co., Ltd., Suzhou (CN)

(72) Inventors: Harry Szommer, Victoria (AU); Warren Brown, Victoria (AU); Graham Gerhardt, Victoria (AU); Xiaoli Pang, Suzhou (CN); Bing Liang, Suzhou (CN); Jun Lu, Suzhou (CN); Zhihan Yang, Suzhou (CN)

(73) Assignee: Positec Power Tools (Suzhou) Co., Ltd, Suzhou (CN)

( * ) Notice: Subject to any disclaimer, the term of this patent is extended or adjusted under 35 U.S.C. 154(b) by 0 days.

(21) Appl. No.: 17/838,154

(22) Filed: Jun. 10, 2022

(65) Prior Publication Data
US 2022/0311258 A1    Sep. 29, 2022

Related U.S. Application Data

(63) Continuation of application No. PCT/CN2020/136188, filed on Dec. 14, 2020.

(30) Foreign Application Priority Data

Dec. 13, 2019   (CN) .......................... 201922242198.5
Jan. 22, 2020   (CN) .......................... 202020145329.8
(Continued)

(51) Int. Cl.
*H02J 7/00* (2006.01)
*B25F 5/02* (2006.01)
(Continued)

(52) U.S. Cl.
CPC ............ *H02J 7/00304* (2020.01); *B25F 5/02* (2013.01); *H01M 10/482* (2013.01);
(Continued)

(58) Field of Classification Search
CPC .... H02J 7/00304; H02J 7/0045; H02J 7/0047; H01M 50/247; H01M 10/482; H01M 10/486; H01M 2220/30; B25F 5/02
(Continued)

(56) References Cited

U.S. PATENT DOCUMENTS 6,243,276 B1   6/2001   Neumann
7,015,675 B1   3/2006   Andre
(Continued)

FOREIGN PATENT DOCUMENTS

CN   2398580 Y    9/2000
CN   1883095 A    12/2006
(Continued)

OTHER PUBLICATIONS

First Chinese Office Action in application No. CN202080009846.5, dated May 27, 2023, 9 pages.
(Continued)

*Primary Examiner* — Hal Kaplan
(74) *Attorney, Agent, or Firm* — Lee & Hayes, P.C.

(57) ABSTRACT

A control device including a first shell; a battery pack mounting part; a first control unit, which is provided in the first shell and is used for cutting off power transmission from a battery pack to an electric power tool when the battery pack is abnormal; a first user operation unit, which is arranged on the first shell and is operated by a user to control the electric power tool; and a first interface, electrically connected to the first user operation unit. An electric power tool system comprises the control device and the electric power tool. The control device can be adapted to different types of electric power tools, and the control device is not provided with a control portion used for adjusting working
(Continued)

parameter of the electric power tool, such that the control device can more flexibly match an upgraded new electric power tool.

16 Claims, 17 Drawing Sheets

(30) Foreign Application Priority Data

Aug. 21, 2020 (CN) .......................... 202010851578.3
Aug. 21, 2020 (CN) .......................... 202021772666.6

(51) Int. Cl.
   *H01M 10/48* (2006.01)
   *H01M 50/247* (2021.01)
(52) U.S. Cl.
   CPC ....... *H01M 10/486* (2013.01); *H01M 50/247* (2021.01); *H02J 7/0045* (2013.01); *H02J 7/0047* (2013.01); *H01M 2220/30* (2013.01)
(58) Field of Classification Search
   USPC .......................................................... 307/131
   See application file for complete search history.

(56) References Cited

U.S. PATENT DOCUMENTS

| | | | |
|---|---|---|---|
| 9,391,305 | B2 | 7/2016 | Yoshinari et al. |
| 2005/0248893 | A1 | 11/2005 | Anderson |
| 2007/0251717 | A1 | 11/2007 | Chiang |
| 2011/0198103 | A1 | 8/2011 | Suzuki |
| 2017/0014984 | A1 | 1/2017 | Rola |
| 2018/0048249 | A1* | 2/2018 | Ikeda ................ H02J 7/00036 |
| 2021/0039243 | A1 | 2/2021 | Schwarz et al. |

FOREIGN PATENT DOCUMENTS

| | | | |
|---|---|---|---|
| CN | 2910373 | Y | 6/2007 |
| CN | 101154819 | A | 4/2008 |
| CN | 101784373 | A | 7/2010 |
| CN | 201898179 | U | 7/2011 |
| CN | 102671796 | A | 9/2012 |
| CN | 106111379 | A | 9/2012 |
| CN | 103534413 | A | 1/2014 |
| CN | 203466379 | U | 3/2014 |
| CN | 103963023 | A | 8/2014 |
| CN | 105762313 | A | 7/2016 |
| CN | 205413713 | U | 8/2016 |
| CN | 105978055 | A | 9/2016 |
| CN | 106181901 | A | 12/2016 |
| CN | 106192834 | A | 12/2016 |
| CN | 106253286 | A | 12/2016 |
| CN | 207094660 | U | 3/2018 |
| CN | 207251228 | U | 4/2018 |
| CN | 207273156 | U | 4/2018 |
| CN | 207676960 | U | 7/2018 |
| CN | 207963154 | U | 10/2018 |
| CN | 208027116 | U | 10/2018 |
| CN | 108800560 | A | 11/2018 |
| CN | 208720509 | U | 4/2019 |
| CN | 208955139 | U | 6/2019 |
| CN | 209343829 | U | 9/2019 |
| CN | 110401385 | A | 11/2019 |
| DE | 202013102928 | U1 | 10/2013 |
| EP | 2534744 | A1 | 12/2012 |
| EP | 2534744 | B1 | 5/2016 |
| EP | 3106565 | A2 | 12/2016 |
| EP | 3106565 | A3 | 12/2017 |
| FR | 2623345 | A1 | 5/1989 |
| FR | 2862558 | A1 | 5/2005 |
| JP | 2005278375 | A | 10/2005 |
| JP | 2014194950 | A | 10/2014 |
| KR | 20070002343 | A | 2/2007 |
| WO | WO2018092995 | A1 | 5/2018 |
| WO | WO2018109214 | A1 | 6/2018 |

OTHER PUBLICATIONS

First Chinese Search Report in application No. CN202080009846.5, dated May 27, 2023, 3 pages.
Supplementary European search report in EP application No. EP20897839.5 dated May 9, 2023, 2 pages.
International Search Report in PCT application No. PCT/CN2020/135385, dated Feb. 24, 2021, 3 pages.
International Search Report in PCT application No. PCT/CN2020/135354, dated Feb. 26, 2021, 2 pages.
International Search Report in PCT application No. PCT/CN2020/136188, dated Mar. 11, 2021, 3 pages.
International Search Report in PCT application No. PCT/CN2021/096817, dated Sep. 1, 2021, 3 pages.
Written opinion in PCT application No. PCT/CN2020/135385, dated Feb. 24, 2021, 4 pages.
Written opinion in PCT application No. PCT/CN2020/135354, dated Feb. 26, 2021, 4 pages.
Written opinion in PCT application No. PCT/CN2020/136188, dated Mar. 11, 2021, 4 pages.
Written opinion in PCT application No. PCT/CN2021/096817, dated Sep. 1, 2021, 4 pages.

* cited by examiner

CONTROL DEVICE AND ELECTRIC POWER TOOL SYSTEM

CROSS-REFERENCE TO RELATED APPLICATIONS

This application is a Continuation of International Application No. PCT/CN2020/136188, filed on Dec. 14, 2020, which claims the benefit of Chinese Application Nos. 201922242198.5, filed on Dec. 13, 2019; 202020145329.8, filed on Jan. 22, 2020; 202010851578.3, filed on Aug. 21, 2020; and 202021772666.6, filed on Aug. 21, 2020, the contents of each of which are all hereby incorporated by reference herein in their entirety.

BACKGROUND

Technical Field

The described embodiments herein relate to the field of electric power tools, and in particular, to a control device and an electric power tool system.

Related Art

Existing electric power tools are usually directly combined with a battery pack, resulting in a large volume of the "combined" electric power tool. During use, when a user moves a main body of the tool, the battery pack follows the main body of the electric power tool, which is inconvenient to carry and store. Moreover, when the user operates the electric power tool for an extended time, the tool may become difficult to control, especially for finer operations.

Therefore, it is desirable to provide a control device and an electric power tool system which overcome the aforementioned defects.

SUMMARY

In view of this, an implementation of this application provides an electric power tool and control device thereof with a wide application, a smaller volume, better man-machine experience, and high efficiency.

To achieve the foregoing objectives, an embodiment of the present invention provides the following technical solutions: an electric power tool system comprising at least two types of electric power tools, a control device used for coupling the electric power tool and a battery pack used as a power supply,
  the control device comprises: a first shell configured to be connected to a battery pack mounting part of the battery pack, a first control unit provided in the first shell and configured to control the battery pack to discharge, a first user operation unit operated by a user to control the electric power tool, and a first interface electrically connected to the first user operation unit;
  the electric power tool comprises: a second shell, a working component, a second control unit provided in the second shell and configured to control the working component, and a second interface electrically connected to the second control unit;
  the battery pack mounting part comprises a pair of guide rails, and the battery pack slides along the pair of guide rails to be engaged or disengaged with the control device; and
  the first interface is connected to the second interface by using a cable, so that the electric power tool is electrically connected to the control device.

In any of the embodiments described herein, the first user operation unit comprises a first switch, configured to permit or prohibit power transmission from the battery pack to the electric power tool.

In any of the embodiments described herein, the second control unit controls a working parameter of the working component according to an internally stored preset control instruction.

In any of the embodiments described herein, the electric power tool further comprises a second user operation unit, the second user operation unit comprising a second switch electrically connected to the second control unit, the second control unit enabling or disabling the working component according to an on/off state of the second switch, and/or, the second user operation unit comprising a second adjustment switch electrically connected to the second control unit, the second control unit adjusting a working parameter of the working component according to an operation of the user on the second adjustment switch.

In any of the embodiments described herein, the working component comprises a motor, an electric heating wire, or a resistance wire.

To achieve the foregoing objectives, this application further provides the following technical solutions:
An electric power tool system, comprising an electric power tool, a control device used for coupling the electric power tool, the control device being coupled to a battery pack to provide electric power to the electric power tool,
  the control device comprises: a first shell, a first control unit provided in the first shell, a first user operation unit configured to be connected to a battery pack mounting part of the battery pack, a first user operation unit configured to be operated by a user to control the electric power tool, and a first interface electrically connected to the first user operation unit;
  the electric power tool comprises: a second shell, a working component, a second control unit disposed in the second shell and configured to control the working component, and a second interface electrically connected to the second control unit;
  the battery pack mounting part comprises a pair of guide rails, and the battery pack is able to slide along the pair of guide rails to be engaged or disengaged with the control device;
  the first interface is connected to the second interface by using a cable, so that the electric power tool is electrically connected to the control device; and
  the second control unit is electrically connected to the first user operation unit by using the cable, obtains an operation of the user on the first user operation unit, and controls the working component according to the operation of the user on the first user operation unit.

In any of the embodiments described herein, the first user operation unit comprises a first adjustment switch, and the second control unit detects an operation of the user on the first adjustment switch by using the cable and generates a first adjustment signal for adjusting a working parameter of the working component.

In any of the embodiments described herein, the cable is provided with three wires inside, two of the wires are conductor wires, configured for power transmission from the battery pack to the electric power tool, and one of the wires is a signal wire, configured to electrically connect the second control unit to the first adjustment switch.

In any of the embodiments described herein, the second control unit adjusts the working parameter of the working component according to the first adjustment signal or controls the working component according to an internally stored preset control instruction.

In any of the embodiments described herein, wherein the electric power tool further comprises a second user operation unit, operated by the user to control the working parameter of the working component.

In any of the embodiments described herein, the second user operation unit comprises a second switch electrically connected to the second control unit, and the second control unit controls on and off configuration of the working component according to an on/off state of the second switch.

In any of the embodiments described herein, the second user operation unit comprises a second adjustment switch electrically connected to the second control unit, and the second control unit generates a second adjustment signal according to an operation of the user on the second adjustment switch, and selects one of the first adjustment signal and the second adjustment signal according to a preset priority to adjust the working parameter of the working component.

To achieve the foregoing objectives, this application further provides the following technical solutions:

A control device, configured to couple at least two types of electric power tools, the electric power tool comprising a second control unit, the control device comprises:
  a first shell;
  a battery pack mounting part, comprising a pair of guide rails configured to be connected to a battery pack detachably, the battery pack being capable of sliding along the pair of guide rails to be engaged or disengaged with the control device;
  a first control unit, disposed in the first shell and configured to detect at least one of parameters of a voltage, a current, and a temperature of the battery pack to determine a working state of the battery pack, and to cut off power transmission from the battery pack to the electric power tool when the battery pack is abnormal; and
  a first interface, electrically connected to the electric power tool by using a cable, the control device transmitting electric energy to the electric power tool by using the first interface.

In any of the embodiments described herein, the electric power tool further comprises an over-current protection unit configured to measure a value of a current flowing into the working component, and to stop an output of the working component when the current value is greater than a predetermined current value.

To achieve the foregoing objectives, this application further provides the following technical solutions:

A control device, configured to couple an electric power tool, the electric power tool comprising a working component and a second interface, wherein the control device comprises:
  a first shell;
  a battery pack mounting part, comprising a pair of guide rails configured to be connected to a battery pack detachably, the battery pack being capable of sliding along the pair of guide rails to be engaged or disengaged with the control device;
  a first control unit, disposed in the first shell and configured to detect at least one of parameters of a voltage, a current, and a temperature of the battery pack to determine a working state of the battery pack, and to cut off power transmission from the battery pack to the electric power tool when the battery pack is abnormal; and
  a first user operation unit, operated by a user to control; and
  a first interface, electrically connected to the first user operation unit, the first interface being connected to the second interface by using a cable, so that the electric power tool is electrically connected to the control device to control the working component according to an operation of the user on the first user operation unit.

In any of the embodiments described herein, the electric power tool comprises a second control unit, the second control unit being electrically connected to the first user operation unit by using the cable to obtain the operation of the user on the first user operation unit.

The control device provided in the foregoing implementation is provided with a first shell, a battery pack mounting part, and a first interface, so that the electric power tool is not required to be provided with a battery pack mounting part configured to be connected to a battery pack. By separately disposing the battery pack and the electric power tool, on the one hand, the volume and the weight of the electric power tool can be reduced, so that the electric power tool is easy to carry and store; and on the other hand, when operating the electric power tool, a user only needs to connect the electric power tool to the control device by using a cable, and then dispose the control device aside for a fine operation. Moreover, because the cable can be bent and of a certain length, a distance between the electric power tool and the control device may vary during operation. Further, it is more convenient to move the electric power tool, and man-machine experience is better.

In addition, by disposing a first user operation unit on the control device, the user may control a main body of the electric power tool by operating the control device, which has good user operability. Moreover, the main body of the electric power tool may select not to be provided with a user operation unit, which reduces the degree of integration of functions of the main body of the electric power tool, so as to improve reliability of the service life of the electric power tool.

To achieve the foregoing objectives, this application further provides the following technical solutions:

A control device configured to be adapted to at least two types of electric power tools is provided, and the control device includes:
  a first shell;
  a battery pack mounting part, including a pair of guide rails configured to be connected to a battery pack detachably, the battery pack being capable of sliding along the pair of guide rails to be engaged or disengaged with the control device;
  a first control unit, disposed in the first shell and configured to detect at least one of parameters of a voltage, a current, and a temperature of the battery pack to determine a working state of the battery pack, and to cut off power transmission from the battery pack to the electric power tool when the battery pack is abnormal;
  a first user operation unit, disposed on the first shell and operated by a user to control a working component of the electric power tool; and
  a first interface, electrically connected to the first user operation unit and electrically connected to the electric power tool by using a cable.

In any of the embodiments described herein, the first control unit is configured to protect the battery, the electric power tool includes a working component and a second control unit, and the second control unit is configured to control the working component.

In any of the embodiments described herein, the first control unit is configured to control the battery pack and the working component of the electric power tool, and the first control unit includes a recognition module, and the recognition module is configured to recognize a type of an electric power tool connected to the control device, so as to select a working parameter matching the electric power tool.

In any of the embodiments described herein, the first user operation unit includes a first switch and/or a first adjustment switch, the first switch is configured to control an electrical connection between the battery pack and the electric power tool, and the first adjustment switch is configured to adjust the working parameter of the electric power tool.

To achieve the foregoing objectives, this application further provides the following technical solutions:

An electric power tool system is provided, including: a control device and an electric power tool matching the control device. The electric power tool includes at least two types of electric power tools.

The control device includes a first shell, a battery pack mounting part disposed on the first shell and configured to be connected to a battery pack, a first control unit that is disposed in the first shell and that may control the battery pack to discharge, a first user operation unit operated by a user to control the electric power tool, and a first interface electrically connected to the first user operation unit.

The electric power tool includes a second shell, a working component, and a second interface.

The battery pack mounting part includes a pair of guide rails configured to be connected to a battery pack detachably, and the battery pack can slide along the pair of guide rails to be engaged or disengaged with the control device.

The first interface is connected to the second interface by using a cable, and therefore, the control device is electrically connected to the electric power tool.

In any of the embodiments described herein, the first control unit is configured to protect the battery, the electric power tool includes a second control unit configured to control a working component, and the second control unit controls the working component according to an internally stored preset control instruction.

In any of the embodiments described herein, the first user operation unit includes a first switch and/or a first adjustment switch, the first switch is configured to control an electrical connection between the battery pack and the electric power tool, and the first adjustment switch is configured to adjust a working parameter of the electric power tool.

In any of the embodiments described herein, the electric power tool includes an electric power tool having no second adjustment switch and an electric power tool having a second adjustment switch. The second adjustment switch is configured to adjust a working parameter of the electronic power tool.

In any of the embodiments described herein, the second adjustment switch is connected to the second control unit and is configured to generate a second adjustment signal, and the first adjustment switch is configured to generate a first adjustment signal.

The second control unit receives the second adjustment signal and selects one of the first adjustment signal and the second adjustment signal according to a preset priority to adjust a working parameter of the working component.

In any of the embodiments described herein, the electric power tool includes an electric power tool having no motor and an electric power tool having a motor, and the motor is a brush motor or a brushless motor. The second control unit includes a motor drive circuit, and a working parameter of the working component includes any one of an output torque, a voltage, a rotation speed, and a power of the motor.

In any of the embodiments described herein, the electric power tool is an electric soldering iron, and the second control unit includes a temperature control unit and a heating circuit.

In any of the embodiments described herein, the first control unit includes a recognition module, configured to recognize a type of an electric power tool connected to the control device, so as to select a working parameter matching the electric power tool.

In any of the embodiments described herein, the at least two electric power tools include at least two of an angle grinder, a straight grinder, a hair dryer, a heat gun, and an electric soldering iron.

In any of the embodiments described herein, the cable is provided with three wires inside, two of the wires are conductor wires, configured for power transmission from the battery pack to the electric power tool, and the remaining wire is a signal wire, configured to electrically connect the tool control unit to the first user operation unit. The second control unit detects, by using the signal wire, a control instruction inputted by the user.

By using the foregoing technical solutions, the control device according to this implementation of this application can be adapted to different types of electric power tools. By disposing the first shell, the battery pack mounting part, and the first interface, the electric power tool is not required to be provided with a power supply inside for providing electric power to a motor. In other words, the power supply is separated from the electric power tool, so that the volume of the electric power tool is reduced.

According to the electric power tool system provided in this application, the control device is not provided with a control part for adjusting a working parameter of an electric power tool, and is only responsible for generating an adjustment signal to the electric power tool, for the electric power tool to adjust a working parameter of the electric power tool according to the adjustment signal. In this case, the control device can match a new generation of electric power tool more flexibly, the application scope is wide, and the applicability is high. Because of the reuse of the control device, not only the adaptivity of the control device described in this implementation of this application can be improved, but also the production cost of the electric power tool system can be reduced.

On the other hand, during operation, it is only necessary to electrically connect the other end of the cable to a motor of the electric power tool, and a second shell may be held by hand to operate the electric power tool. Because the cable can be bent, during operation, a distance between the electric power tool and the control device can vary, and further, it is convenient to move the electric power tool, and man-machine experience is better. In addition, the electric power tool according to this implementation of this application adopts a brushless motor, and therefore, the efficiency is higher.

This application further provides an electric connector, including: a male joint and a female joint. One of the male joint and the female joint is configured to be connected to an electric power tool, and the other one of the male joint and the female joint is configured to be connected to a control device. The control device is provided with a mounting part configured to be connected to a battery pack. The male joint is electrically or mechanically connected or disconnected to the female joint, so that the electric power tool receives an electric power transmitted from the control device by using the electric connector. The male joint is provided with three terminals in total, which are respectively a positive terminal, a negative terminal, and a signal terminal.

In any of the embodiments described herein, a maximum current that the positive terminal and the negative terminal allow to flow is in a range of 9 A to 13 A.

Compared with the related art, the electric connector provided in this application implements power transmission between a control device having a battery pack and an electric power tool with a high current requirement, and the safety is high.

In any of the embodiments described herein, the male joint is a plug and the female joint is a socket. The plug is provided with pins, including a first pin constructed as a positive terminal, a second pin constructed as a negative terminal, and a third pin constructed as a signal terminal.

In any of the embodiments described herein, the first pin and the second pin have the same shape and size. In addition, a diameter of the first pin is in a range of 1.98 mm to 2.02 mm.

In any of the embodiments described herein, the socket is provided with a jack adapted to the pin. The jack is fixedly provided with a clamping component configured to clamp the pin, and the clamping component is an elastic component and made of a conductive material.

In any of the embodiments described herein, a clamping diameter of the clamping component in a natural state is in a range of 1.9 mm to 1.94 mm.

In any of the embodiments described herein, the female joint is configured to be connected to an electric power tool, and the male joint is configured to be connected to the control device by using a cable.

In any of the embodiments described herein, the electric connector is further provided with a keeping unit, configured to keep the male joint and the female joint at a connected state. The keeping unit includes an elastic coupling part disposed on one of the male joint and the female joint, and an auxiliary coupling part, matching the elastic coupling part, disposed on the other one of the male joint and the female joint.

The male joint and the female joint are connected in a plugged manner, and keeping forces of the two in the connected state are set within a reasonable range. It not only meets the reliability of high current transmission, but also facilitates user operation and improves user experience.

This application further provides a controller, configured to be connected to an electric power tool to provide an electric power to the electric power tool. The controller includes: a control device, provided with a battery pack mounting part; and an electric connector, including a male joint disposed on one of the control device and the electric power tool, and a female joint disposed on the other one of the control device and the electric power tool. The male joint is configured to match the female joint. The male joint is provided with three terminals in total, which are respectively a positive terminal, a negative terminal, and a signal terminal. The control device includes a first control unit and a first user operation unit. The signal terminal is electrically connected to the first user operation unit to transmit an adjustment signal reflecting the first user operation unit to the electric power tool.

In any of the embodiments described herein, the male joint or the female joint is fixedly connected to the control device or fixedly connected to the control device by using a cable.

This application further provides an electric power tool system, including: an electric power tool; a control device, provided with a mounting part configured to be connected to a battery pack; and an electric connector, including a male joint and a female joint. One of the male joint and the female joint is configured to be connected to the electric power tool, and the other one of the male joint and the female joint is configured to be connected to the control device. The male joint is electrically and mechanically connected to the female joint, so that the electric power tool receives an electric power transmitted from the control device by using the electric connector. The male joint is provided with three terminals in total, which are respectively a positive terminal, a negative terminal, and a signal terminal. According to the foregoing electronic power tool system, where the male joint is constructed as a plug to be connected to the control device by using a cable, and the female joint is constructed as a socket to be connected to the electric power tool. In addition, the control device is provided with a first control unit and a first user operation unit, and the first user operation unit is electrically connected to the male joint. The electric power tool is provided with a second control unit, and the female joint is electrically connected to the second control unit. When the male joint is electrically and mechanically connected to the female joint, the first user operation unit is electrically connected to the second control unit.

BRIEF DESCRIPTION OF THE DRAWINGS

The accompanying drawings described herein are only for illustration, and are not intended to limit the scope of the disclosure of this application in any manner. In the accompanying drawings:

FIG. 6b is a schematic structural diagram related to a female joint in the electric connector shown in FIG. 6a.

FIG. 8a is a view of a male joint at another viewing angle in the electric connector shown in FIG. 6a; and FIG. 8b is a view of a female joint at another viewing angle in the electric connector shown in FIG. 6a;

DETAILED DESCRIPTION

Figure 1:
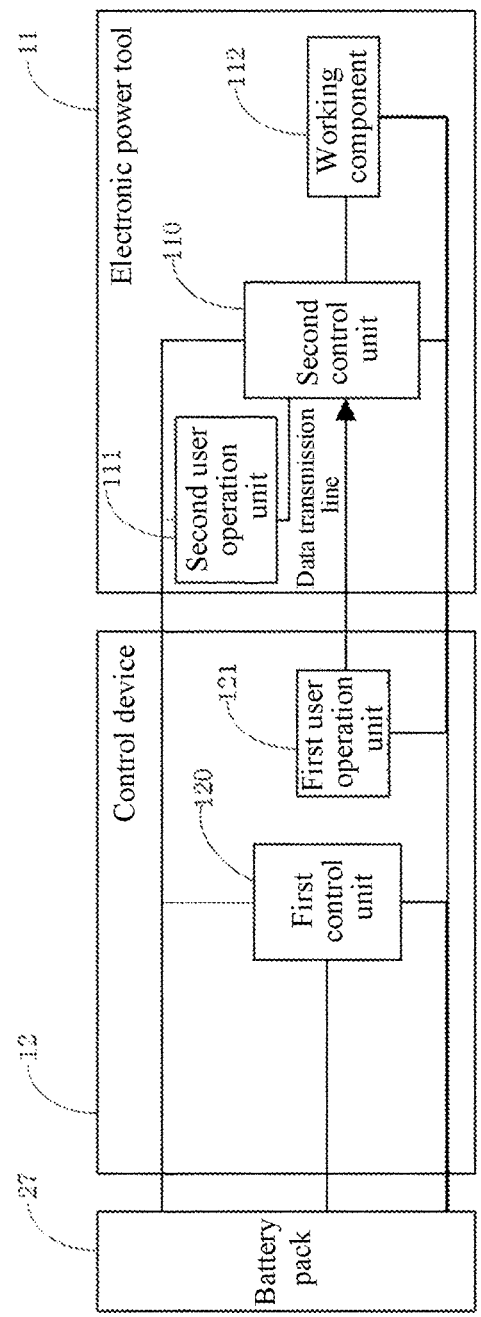
FIG. 1 is a schematic modular diagram of the electric power tool system according to an embodiment of the invention.

The following clearly and completely describes the technical solutions in the implementations of this application with reference to the accompanying drawings. The described embodiments are merely some but not all of the implementations of this application. All other implementations obtained by a person of ordinary skill in the art based on the embodiments of this application without creative efforts shall fall within the protection scope of this application.

It is to be noted that, when a component is referred to as "being disposed to" another component, the component may be directly on the another component, or there may be an intermediate component. When a component is considered to be "connected to" another component, the component may be directly connected to the another component, or there may be an intermediate component. The terms "vertical", "horizontal", "left", "right", and similar expressions used in this specification are only for purposes of illustration but not indicate a unique implementation.

Unless otherwise defined, meanings of all technical and scientific terms used in this specification are the same as those usually understood by a person skilled in the art to which this application belongs. In this application, terms used in the specification are merely intended to describe objectives of the specific embodiments, but are not intended to limit this application of the control device and the electric power tool system.

Referring to FIG. 1 through FIG. 4, an embodiment of this application provides a control device 12, configured to couple a battery pack 27 to provide an electric power to an electric power tool 11. The control device 12 includes a first shell 15, a battery pack mounting part 25 configured to be connected to the battery pack 27, a first control unit 120 that is disposed in the first shell 15 and that may control the battery pack 27 to discharge energy stored therein, and a first user operation unit 121 operated by a user to control the electric power tool 11. The first shell 15 includes a first shell part 151 and a second shell part 152. The battery pack mounting part 25 is disposed on the second shell part 152. The battery pack mounting part may be integrally formed with the second shell part 152, or may be disposed on the second shell part 152 in a fixed manner. The battery pack mounting part 25 includes a pair of guide rails, and the battery pack 27 is able to slide along the pair of guide rails to be engaged or disengaged with the control device 12. Certainly, the battery pack 27 may alternatively be detachably connected to the battery pack mounting part 25 in another manner.

The first control unit 120 is connected to the battery pack 27, may control the battery pack 27 to discharge, and is configured to protect the battery pack 27. When the first control unit 120 detects that the battery pack 27 is abnormal, for example, the battery pack 27 has an over-temperature, an under-voltage, an over-current, or the like, the first control unit 120 may cut off an external power supply circuit of the control device 12 to enable the battery pack 27 to stop charging. In one embodiment, a specific structure of the first control unit 120 may include a microcontroller unit (MCU) and a peripheral working circuit thereof.

The first user operation unit 121 is disposed on the first shell 15, and the user can operate the first user operation unit 121 to control the electric power tool 11 to work. The first user operation unit 121 includes a first switch 28, and the first switch 28 is disposed on the first shell 15, located on the external power supply circuit of the control device 12, and configured to control an electric power transmission from the battery pack 27 to the electric power tool 11. In this embodiment, the first switch 28 may be a manual button for the user to control manually.

The control device 12 further includes a first interface 21, electrically connected to the first user operation unit 121, and configured to be connected to the electric power tool 11 by using a cable 23. Therefore, the first user operation unit 121 is connected to the electric power tool 11 to control the electric power tool 11 to work. When using the electric power tool 11, the control device 12 may be electrically connected to the electric power tool 11 by using the cable 23, and the battery pack 27 may provide an electric power to the electric power tool 11. During operation, the user only needs to hold the electric power tool 11 by hand for operation. The battery pack 27 and the control device 12 may be disposed separate from the electric power tool 11 without bearing the weight of the battery pack 27, which facilitates finer operation possibilities using the electric power tool 11.

The control device 12 provided above can be adapted to different types of electric power tools. The electric power tool herein refers to a tool driven by an electric power, including but not limited to: an angle grinder, a straight grinder, a heat gun, a hair dryer, an electric soldering iron, an electric blower, a paint gun, or the like. It may be seen that, the electric power tool may be an electric power tool having a motor, for example, may be an angle grinder, a straight grinder, or the like. Alternatively, the electric power tool may be an electric power tool having no motor, for example, an electric soldering iron or the like. In this case, the control device 12 may be used repeatedly, and not only can the adaptivity of the control device 12 in this implementation of this application be improved, but also the production cost of the electric power tool system can be reduced.

Referring to FIG. 1 through FIG. 4, an electric power tool is listed. The electric power tool 11 is provided with a second interface 22, and the first interface 21 may be connected to the second interface 22 by using the cable 23, so that the control device 12 is electrically connected to the electric power tool 11.

The electric power tool 11 further includes a second shell 18, a working component 112, and a second control unit 110 disposed inside the second shell 18 and configured to control the working component 112 to work. The working component 112 varies according to different types of electric power tools. For example, an electric power tool includes a motor, and a working component 112 of the electric power tool includes a motor. For example, the electric power tool is an angle grinder, a straight grinder, a heat gun, a hair dryer, or the like. If an electric power tool does not have a motor, a working component 112 of the electric power tool may include a resistance wire, a heating wire, or the like. For example, the electric power tool is an electric soldering iron or the like.

A second control unit 110 is electrically connected to the second interface 22. When the first interface 21 is connected to the second interface 22 by using the cable 23, the second control unit 110 inside the electric power tool 11 may be electrically connected to the first user operation unit 121 in the control device 12. In other words, when the first interface 21 is connected to the second interface 22 by using the cable 23, the user operates the first switch 28, and when the first switch 28 is closed, the first interface 21 may obtain electric energy from the battery pack, so that the electric power tool 11 may obtain electric energy from the control device 12 by using the cable 23, and then the electric power tool 11 enables the working component 112 to start to work after obtaining the electric energy. Alternatively, the first control unit 120 in the control device 12 detects an on/off state of the first switch 28. When it is detected that the first switch 28 is closed, the first control unit 120 controls the battery pack 27 to output electric energy, so that the electric power tool may obtain electric energy from the control device by using the cable. After the electric power tool 11 obtains the electric energy, the second control unit 110 controls the working component 112 to start to work. In addition, the second control unit 110 in the electric power tool 11 may detect an on/off state of the first switch 28 by using the cable, and when it is detected that the first switch 28 is closed, the working component 112 is controlled to start to work. In this embodiment, the second control unit 110 may automatically control a working parameter of the working component 112 according to an internally stored preset control instruction. Herein, the working parameter varies according to different types of electric power tools, for example, the electric power tool 11 includes a motor, and the working parameter of the electric power tool includes any one of an output torque, a voltage, a rotation speed, and a power of the motor; and if the electric power tool does not include a motor, the working parameter includes a temperature of a resistance wire or a heating wire and the like.

In any of the embodiments described herein, the first user operation unit 121 further includes a first adjustment switch 35, and the first adjustment switch 35 may be operated by the user to control the working component 112 of the electric power tool 11, and is configured to generate a first adjustment signal for adjusting the working parameter of the electric power tool 11 and transmit the first adjustment signal to the electric power tool 11. Alternatively, the electric power tool 11 actively obtains the first adjustment signal, so that the electric power tool 11 may adjust the working parameter of the electric power tool 11 according to the adjustment signal. The first adjustment switch 35 may be a manually adjusted button for the user to adjust manually.

The first adjustment signal may be a speed adjustment signal, a temperature adjustment signal, or another to-be-adjusted signal. In one embodiment, the first adjustment switch 35 is configured to generate a speed adjustment signal. Specifically, the first adjustment switch 35 is a speed adjustment button. During operation, if the user presses the first adjustment switch 35, the second control unit 110 may obtain a control instruction of the user by using the cable 23 and adjust the working parameter of the working component 112 according to the control instruction of the user. In this case, a speed adjustment function of the main body of the electric power tool 11 is integrated on the control device 12, in other words, the control device 12 may be adopted to output a speed adjustment signal to the electric power tool 11, so the speed adjustment function does not need to be integrated on the electric power tool 11.

In another embodiment, the first adjustment switch 35 is configured to generate a temperature adjustment signal. Specifically, when the first adjustment switch 35 is a temperature adjustment button and the first adjustment signal is a temperature adjustment signal, a temperature adjustment function of the main body of the electric power tool 11 is integrated on the control device 12; in other words, the control device 12 may be adopted to output a temperature adjustment signal to the electric power tool 11, so the temperature adjustment function does not need to be integrated on the electric power tool 11.

The control device 12 is not provided with a control part for adjusting a working parameter of the electric power tool 11, and is only responsible for generating an adjustment signal for the electric power tool 11. A control function is still carried out by the electric power tool 11, and the electric power tool 11 adjusts a working parameter of the electric power tool according to the adjustment signal. Specifically, the first control unit 120 is configured to protect the battery pack 27. As described above, the electric power tool 11 includes the working component 112 and the second control unit 110, and the second control unit 110 is configured to control the working component 112. Because different electric power tools and new generations of electric power tools usually have different working parameters, and if a control function is integrated on the control device 12, the control device inevitably needs to store many control policies for selection. However, for a new generation of product, an old control device needs to be discarded or needs to upgrade the configuration for matching a new electric power tool product, and therefore, the control device 12 needs to be adjusted or even replaced frequently. According to embodiments of this invention, a control function is still placed on the electric power tool 11, and the control device 12 is only responsible for generating an adjustment signal for the electric power tool 11, so that the control device 12 can match a new generation of electric power tool more flexibly, the application scope is wide, and the applicability is high. Because of the reuse of the control device 12, not only the adaptivity of the control device 12 described in this implementation of this application can be improved, but also the production cost of the entire system can be reduced.

By disposing the first shell 15, the battery pack mounting part 25, and the first interface 21 on the control device 12 provided in the foregoing embodiment(s), the electric power tool 11 does not need to be provided with the battery pack mounting part 25 configured to be connected to the battery pack 27. By separately disposing the battery pack 27 and the electric power tool 11, on the one hand, the volume and the weight of the electric power tool 11 can be reduced, so that the electric power tool is easy to carry and store; and on the other hand, when operating the electric power tool 11, a user only needs to connect the electric power tool 11 to the control device 12 by using the cable 23, and then dispose the control device 12 separately for a fine operation. Moreover, because the cable 23 can be bent and of a certain length, a distance between the electric power tool 11 and the control device 12 may vary during operation. Further, it is more convenient to move the electric power tool 11, and man-machine experience is better. In addition, by disposing the first user operation unit 121 on the control device 12, an adjustment function of the main body of the electric power tool 11 may be integrated on the control device 12; in other words, the control device 12 may be adopted to output an adjustment signal to the electric power tool 11, so the adjustment function does not need to be integrated on the electric power tool 11, which reduces the degree of integration of functions of the main body of the electric power tool 11, so as to improve the reliability and service life of the electric power tool 11.

In this case, the control device 12 may be used repeatedly, and not only can the adaptivity of the control device 12 in this disclosure be improved, but also the production cost of the electric power tool system can be reduced.

An embodiment of the invention further provides an electric power tool system, including the control device 12 and the electric power tool 11 matching the control device 12. The electric power tool 11 includes, but is not limited to: an angle grinder, a straight grinder, a heat gun, a hair dryer, an electric soldering iron, an electric blower, a paint gun, or the like. The electric power tool includes the second shell 18, the working component 112, and the second interface 22. The first interface 21 is connected to the second interface 22 by using an electric connector 30, so that the control device 12 is electrically connected to the electric power tool 11. The first control unit 120 is configured to protect the battery pack 27, the electric power tool 11 includes a second control unit 110 configured to control the working component 112, and the second control unit 110 controls the working component 112 according to an internally stored preset control instruction.

In any of the embodiments described herein, the electric power tool 11 includes at least two types of electric power tools.

In one embodiment described herein, the electric power tool includes an electric power tool having no second adjustment switch and an electric power tool having a second adjustment switch. The second adjustment switch is configured to adjust a working parameter of the electric power tool. The second adjustment switch is connected to the second control unit and is configured to generate a second adjustment signal. The first adjustment switch is configured to generate a first adjustment signal. The second control unit receives the second adjustment signal and selects one of the first adjustment signal and the second adjustment signal according to a preset priority to adjust a working parameter of the working component.

In another embodiment described herein, the electric power tool includes an electric power tool having no second control unit and an electric power tool having a second control unit. For the electric power tool having a second control unit, the second control unit controls the working component according to an internally stored preset control instruction. For the electric power tool having no second control unit, the control device transmits an electric power to the electric power tool, and the electric power tool is controlled by the first user operation unit 121 on the control device to work.

In other embodiments described herein, the electric power tool includes an electric power tool having no motor and an electric power tool having a motor, and the motor is a brush motor or a brushless motor. The second control unit includes a motor drive circuit, and a working parameter of the working component includes any one of an output torque, a voltage, a rotation speed, and a power of the motor.

When the electric power tool is an electric power tool having no motor, for example, an electric soldering iron, the electric power tool includes a soldering iron core and a solder tip, a working component of the electric power tool is the soldering iron core, and the second control unit includes a temperature control unit and a heating circuit.

In one embodiment described herein, the control device 12 may be provided with at least two first interfaces 21, and each of the first interfaces 21 may be connected to one electric power tool 11 by using the cable 23, so that the control device 12 may supply power for a plurality of electric power tools 11 at the same time. It may be understood that when a plurality of first interfaces 21 are disposed on the control device 12, specific structure forms of the plurality of first interfaces 21 may be different, alternatively, structure forms of the plurality of first interfaces 21 may be the same.

In other embodiments described herein, the control device 12 may further include a charging interface and a power supply conversion circuit connected to the charging interface, and the power supply conversion circuit is connected to the battery pack 27 or the first interface 21. The charging interface is configured to be connected to an external power supply. The external power supply may charge the battery pack 27 by using the power supply conversion circuit. Alternatively, an electric power of the external power supply is converted by using the power supply conversion circuit to supply power for the electric power tool 11 by using the first interface 21.

In any of the embodiments described herein, the control device 12 may further include at least one third interface. The third interface is configured to be connected to an external alternating current power supply, and may be connected to an electric power tool by using a cable to provide an alternating current to the electric power tool. In the foregoing embodiment, the control device 12 may be connected to a plurality of electric power tools 11 to supply power for the plurality of electric power tools 11 at the same time, and the control device 12 may provide both a direct current and an alternating current to the electric power tools 11. There are a plurality of power supply forms and it is convenient to supply power.

Figure 3:
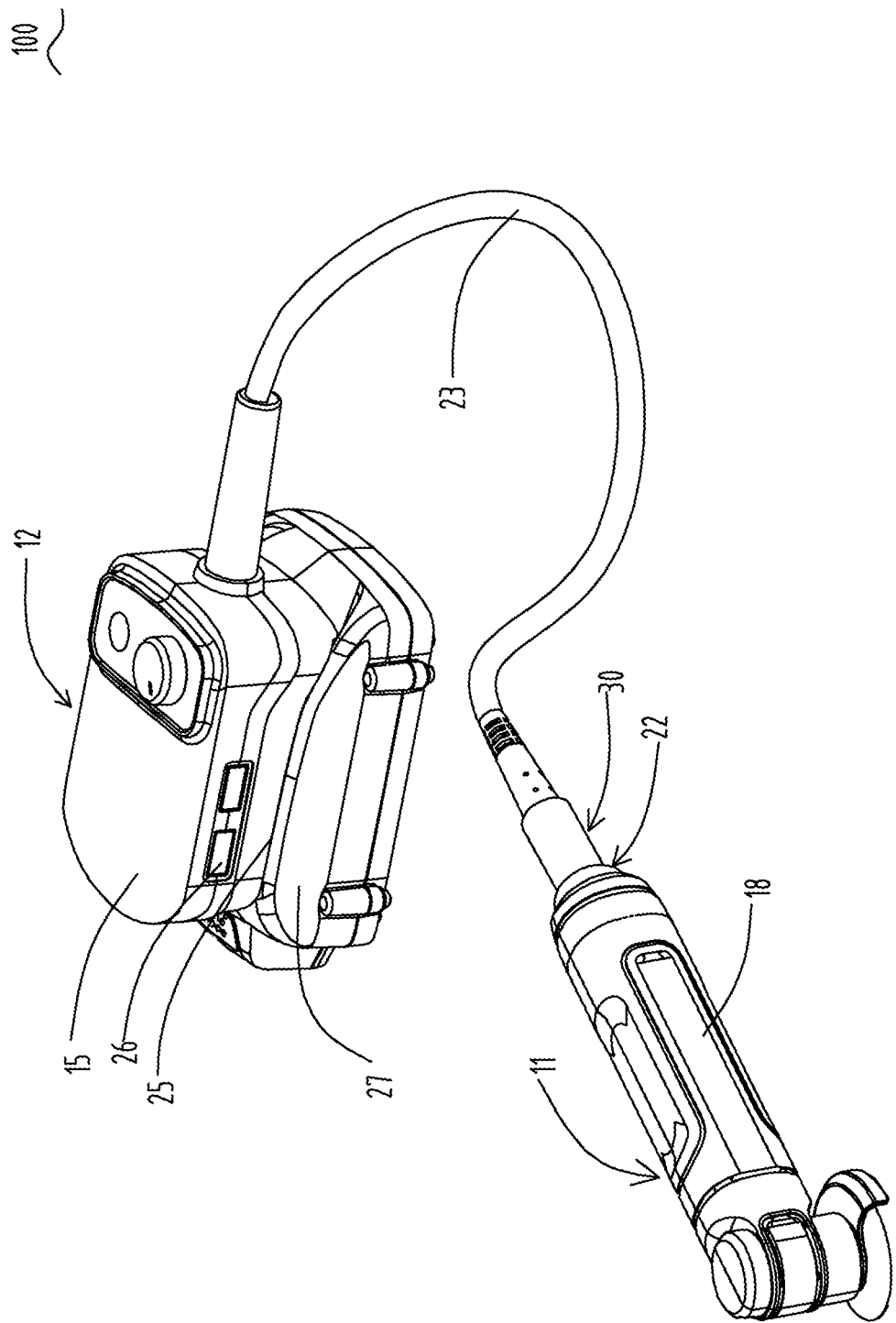
FIG. 3 is a schematic structural diagram of the electric power tool system 100 according to an embodiment of the invention, where a control device is connected to an electric power tool by using an electric connector.

The following describes different electric power tools separately. For example, as shown in FIG. 3 to FIG. 5, the electric power tool 11 is an angle grinder.

As shown in FIG. 1 and FIG. 3 to FIG. 5, the electric power tool 11 includes the second shell 18, the working component 112 disposed in the second shell 18 (in this embodiment, the working component 112 is a motor 16), the second control unit 110, and the second interface 22 disposed on the second shell 18. Specifically, the second shell 18 is of a hollow structure. The hollow part forms an accommodation cavity. The motor 16 is received in the accommodation cavity, and further, the motor 16 is protected by the second shell 18, which improves the safety. Further, the electric power tool 11 further includes a drive circuit, and the second control unit 110 controls the drive circuit to control the motor 16 to work. The second interface 22 disposed on the second shell 18 is electrically connected to the second control unit 110, and further, when the second interface 22 is electrically connected to the first interface 21 by using the cable 23, the first user operation unit 121 may be electrically connected to the second control unit 110 by using the cable 23. Further, the control device 12 is electrically connected to the electric power tool 11.

Figure 4:
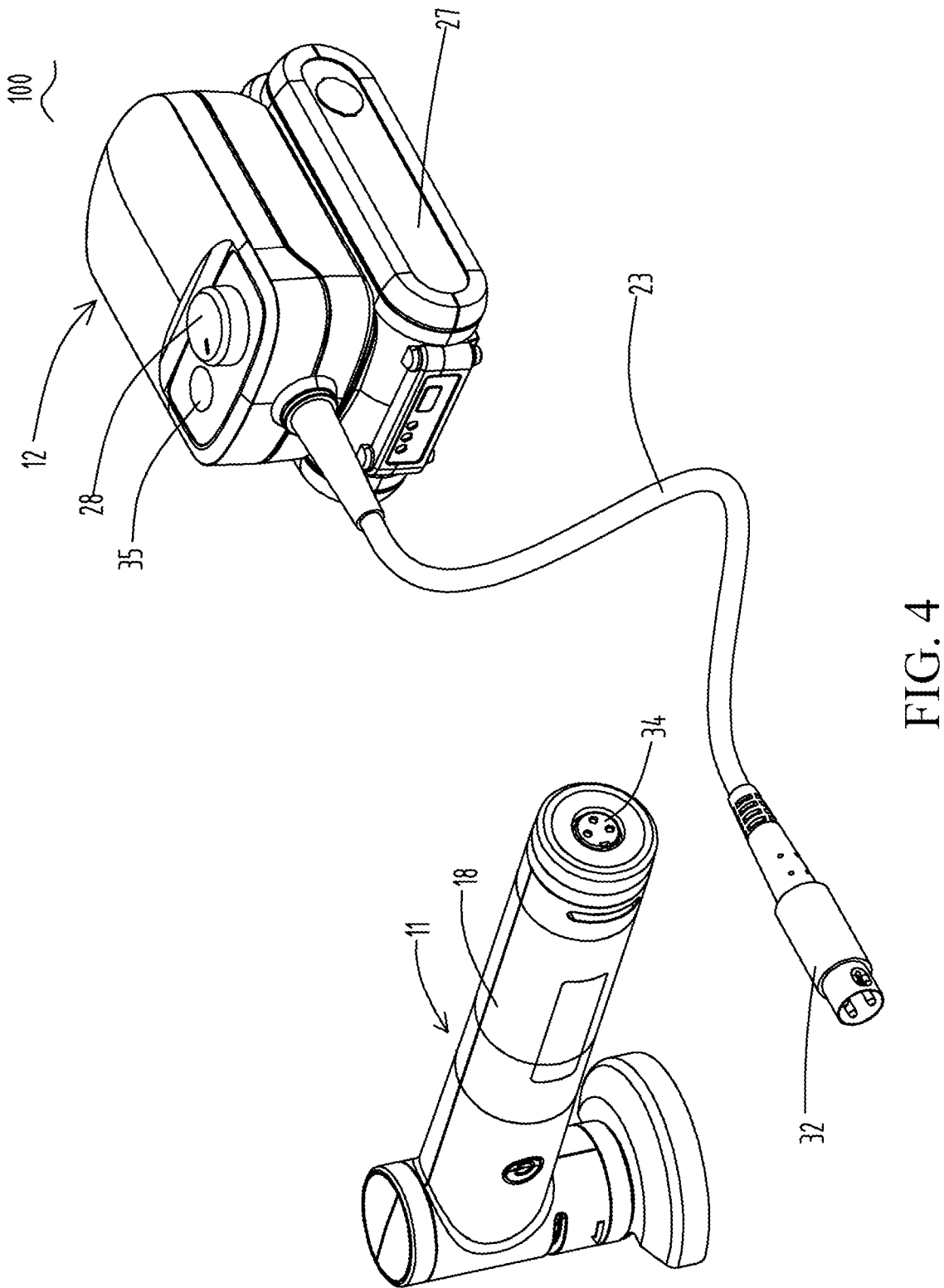
FIG. 4 is a schematic structural diagram of the electric power tool system 100 shown in FIG. 3, where a control device is not connected to an electric power tool.
Figure 5:
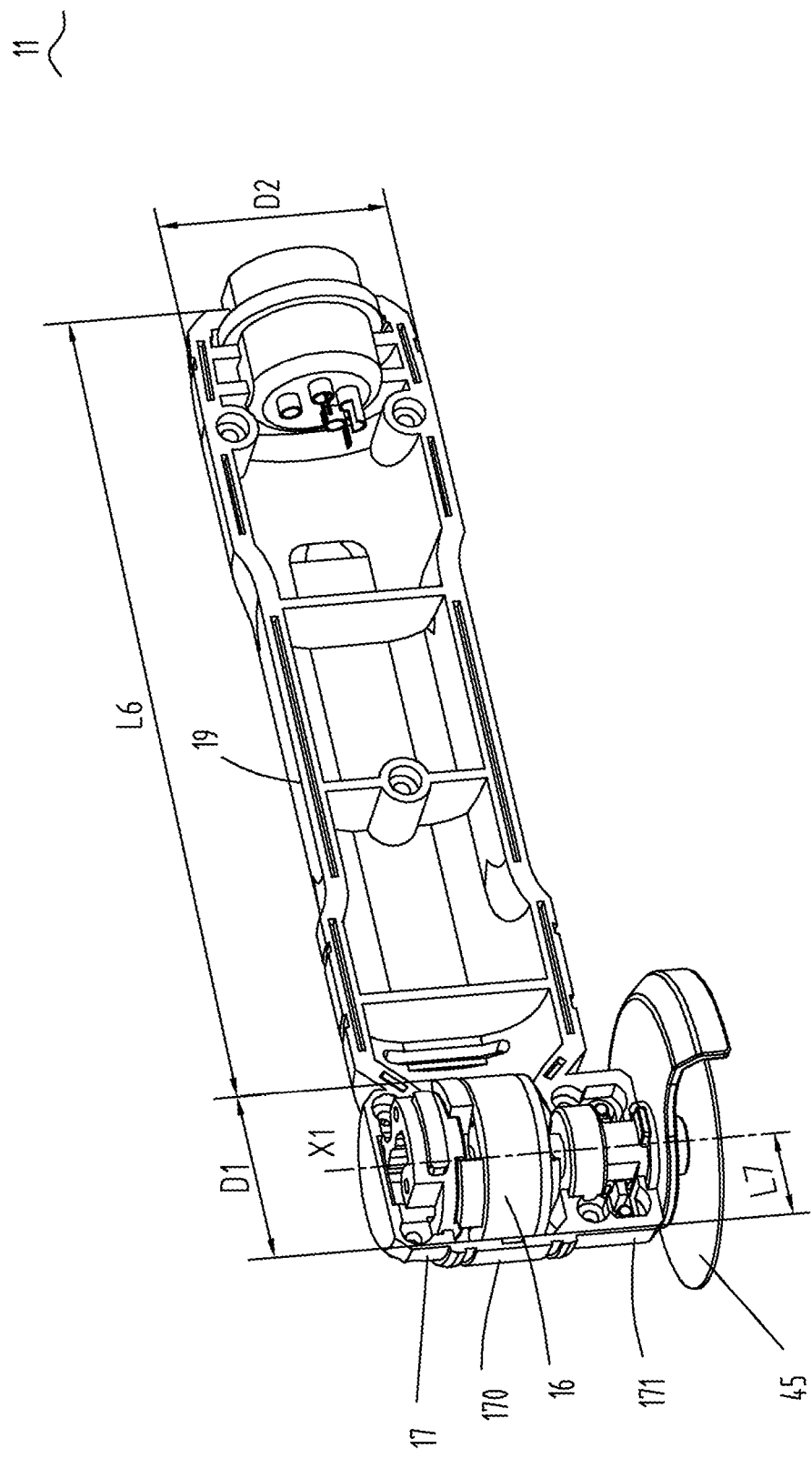
FIG. 5 is a schematic structural diagram of the electric power tool in the electric power tool system, when the electric power tool is an angle grinder, of which a half shell is removed according to this embodiment of the invention.

As shown in FIG. 4, the cable 23 has a first end connected to the control device 12 and a second end connected to the electric power tool 11. In this embodiment, the first end of the cable 23 is fixedly connected to the control device 12, and a conductor wire inside the first end is electrically connected to the first control unit. The second end of the cable 23 is detachably connected to the electric power tool 11.

Figure 6A:
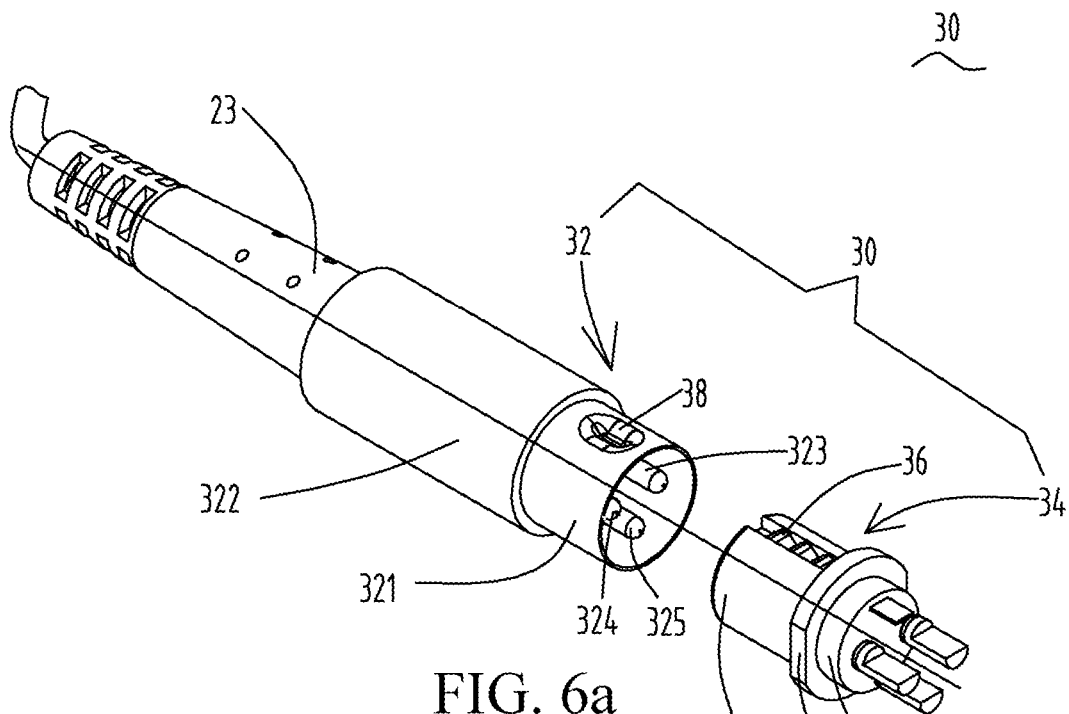
FIG. 6a is a schematic structural diagram related to an electric connector in the electric power tool system shown in FIG. 3.

The second end of the cable 23 is connected to the electric power tool 11 by using the electric connector 30. Referring to FIG. 4 and FIG. 6a, the electric connector 30 includes a male joint 32 and a female joint 34. The male joint 32 is configured to be connected to the control device 12, and the female joint 34 is configured to be connected to the electric power tool 11. When the male joint 32 is electrically and mechanically connected to the female joint 34, the electric power tool 11 receives, by using the electric connector 30, an electric power transmitted by the control device 12.

The male joint is provided with three terminals in total, which are respectively a positive terminal, a negative terminal, and a signal terminal. The positive terminal and the negative terminal are power supply terminals, and are configured to transmit an electric power from the battery pack 27 mounted on the control device 12 to the electric power tool 11. The signal terminal is configured to transmit an electric signal reflecting a specific operation of the user on the first user operation unit to the electric power tool 11. In this embodiment, the male joint 32 is constructed as a plug to be connected to the control device 12 by using the cable 23, and the female joint 34 is constructed as a socket.

Specifically, as shown in FIG. 6a, the male joint 32 includes a third shell, and the third shell has a first cylinder part 321 and a second cylinder part 322. The first cylinder part 321 is in a hollow cylinder shape and is fixedly provided with a pin inside. The second cylinder part 322 is configured to accommodate the cable 23.

In this embodiment, there are three pins, which are respectively a first pin 323, a second pin 324, and a third pin 325. The three pins are arranged in parallel. The first pin 323 and the second pin 324 are constructed as power supply terminals and are configured to transmit an electric power of the battery pack 27 mounted on the control device 12 to the electric power tool 11. The third pin 325 is constructed as a signal terminal and is configured to transmit an electric signal reflecting an operation of the first user operation unit 121 to the electric power tool 11. Herein, the first pin 323 is defined as a positive terminal, the second pin 324 is defined as a negative terminal, and the third pin 325 is defined as a signal terminal.

Figure 7:
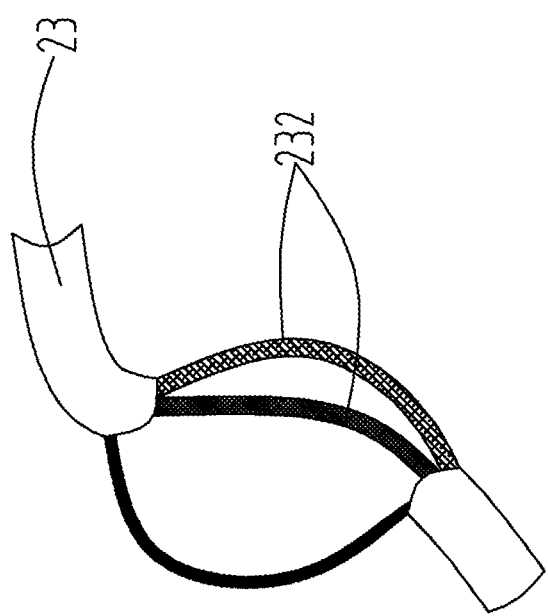
FIG. 7 is a detailed diagram of a partially stripped cable in the electric power tool system shown in FIG. 3.

Correspondingly, as shown in FIG. 7, the cable 23 is provided with three wires 232 inside. Two of the wires are conductor wires, which are respectively in communication with the first pin 323 and the second pin 324; and the remaining wire is a signal wire that is in communication with the third pin 325.

Figure 6B:
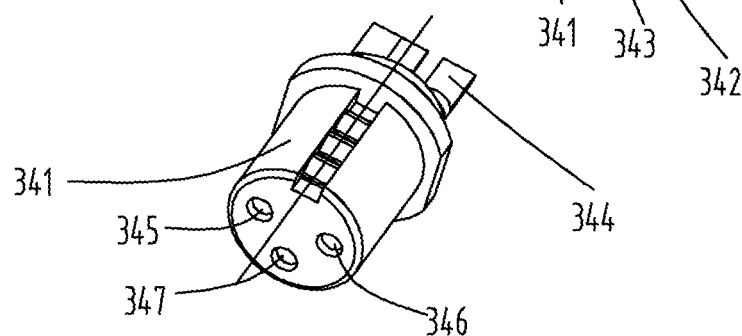

As shown in FIG. 6a and FIG. 6b, the female joint 34 includes a fourth shell, and the fourth shell has a rear part 341 configured to be adapted to a shape of the first cylinder part 321, a front part 342 away from the rear part 341, and a shoulder part 343 connected to the rear part 341 and the front part 342. The rear part 341, the front part 342, and the shoulder part 343 are generally in a cylinder shape and are arranged in a stepped distribution. The three parts are all made of non-conductive materials, and the shoulder part 343 has a bigger radial dimension than those of the front part 342 and the rear part 341. The rear part 341 is provided with three jacks configured to be adapted to a shape of the pin. In addition, each jack is fixedly provided with a clamping component 344 configured to clamp the pin inside, and the other end of the clamping component 344 runs through the shoulder part 343 and the front part 342 and protrudes, to form a connection terminal configured to be connected to the electric power tool 11. Herein, jacks of the first pin 323, the second pin 324, and the third pin 325 are respectively defined as a first jack 345, a second jack 346, and a third jack 347.

Figure 6C:
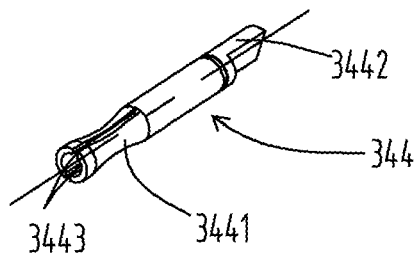
FIG. 6c is a schematic structural diagram related to a clamping component in the female joint shown in FIG. 6b.

Referring to FIG. 6c, the clamping component 344 extends in a longitudinal direction, and has a first end 3441 and a second end 3442 in an extension direction of the clamping component. The first end 3441 is in a hollow cylinder structure, and cutting grooves 3443 are spaced on an outer wall of the first end in a circumference direction. In this embodiment, there are two cutting grooves 3443 spaced at 180 degrees apart. The second end 3442 is in a half-cylinder shape and is configured to be connected to the electric power tool 11. In a natural state, in other words, when the pin is not inserted into the first end 3441, a clamping diameter of the clamping component 344 is minimum; and when the pin is inserted, the clamping component 344 is pushed open, and a clamping diameter increases.

Figure 8A:
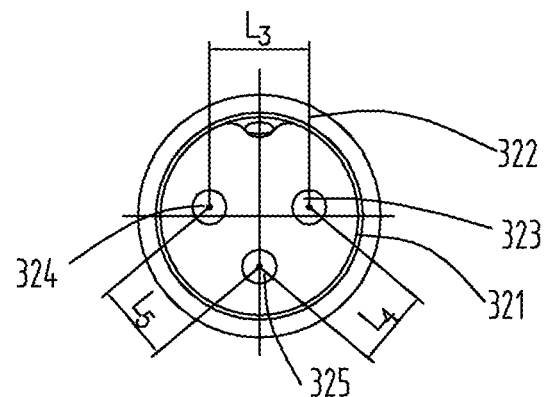
Figure 8B:
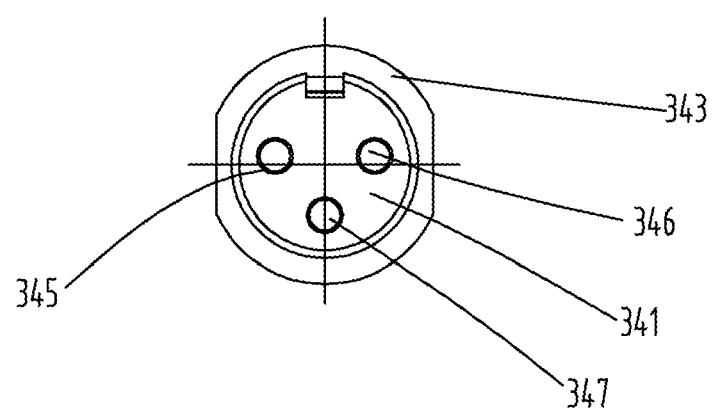

As shown in FIG. 8a, the pins are projected on a plane perpendicular to extension directions of the pins, and contours of the first pin 323, the second pin 324, and the third pin 325 approximately form an isosceles triangle. A distance L3 between the first pin 323 and the second pin 324 is 6.4 mm, and a distance L4 between the first pin 323 and the third pin 325 is equal to a distance L5 between the second pin 324 and the third pin 325, which are both 5 mm. Correspondingly, as shown in FIG. 8b, the jacks are projected on a plane perpendicular to extension directions of the jacks, and contours of the first jack 345, the second jack 346, and the third jack 347 approximately form an isosceles triangle.

In this embodiment, an inner diameter of the first cylinder part 321 is 12.7 mm. Correspondingly, an outer diameter of the rear part 341 is 12 mm.

In any of the embodiments described herein, the male joint 32 may be selected to be connected to the electric power tool 11 and the female joint 34 may be selected to be connected to the control device 12, as long as the two can match each other and can transmit an electric power from the battery pack 27 to the electric power tool 11 by using the control device 12.

In this embodiment, the male joint 32 is fixedly connected to the control device 12 by using the cable 23, and the female joint 34 is fixedly connected to the electric power tool 11. As such, the connection between the control device 12 and the electric power tool 11 can be cut off by simply separating the male joint 32 from the female joint 34.

In this case, the electric power from the battery pack 27 needs to be transmitted to the electric power tool 11 by using the cable 23 and the electric connector 30. Generally, a maximum current that the wires in the cable 23 allow to flow is 10 A, which may satisfy electric power requirements of different types of electric power tools 11. However, in the existing electric connectors, a radial dimension of the pin is usually not greater than 1.5 mm, and a maximum current allowed to flow does not exceed 6 A, which cannot satisfy a high current requirement of a specific electric power tool; otherwise, the electric connector 30 may overheat, and becomes unsafe.

In view of this, in the electric connector 30 according to embodiments of this invention, diameters of power supply terminals, in other words, the first pin 323 and the second pin 324, configured to transmit electric power of the battery pack 27 are in a range of 1.98 mm to 2.02 mm. A maximum current that the first pin 323 and the second pin 324 allow to flow is in a range of 9 A to 13 A. Preferably, a maximum current that the first pin 323 and the second pin 324 allow to flow is in a range of 10 A to 12 A.

Preferably, diameters of the first pin 323 and the second pin 324 are 2 mm. The third pin 325 is configured for signal transmission, a current value that the third pin allows to flow is relatively small, and a diameter of the third pin is in a range of 1 mm to 1.2 mm. However, the third pin 325 may also have the same diameter size as the first pin 323 or the second pin 324 for convenience.

Further, to ensure the safety of power transmission in a working process of the electric power tool 11 and to prevent the male joint 32 and the female joint 34 from easily loosing, the male joint 32 and the female joint 34 in this embodiment are in interference fit. Specifically, as shown in FIG. 6a and FIG. 6c, in the male joint 32, diameters of the first pin 323 and the second pin 324 are in a range of 1.98 mm to 2.02 mm; and in the female joint 34, a clamping diameter of the clamping component 344 configured to clamp the first pin 323 and the second pin 324 is in a range of 1.9 mm to 1.94 mm. The clamping diameter herein refers to a clamping diameter of the clamping component 344 in a natural state.

In any of the embodiments described herein, the electric connector 30 may be further provided with a keeping unit configured to keep a connected state between the male joint 32 and the female joint 34, so that the joints are not easily loosened.

Figure 9:
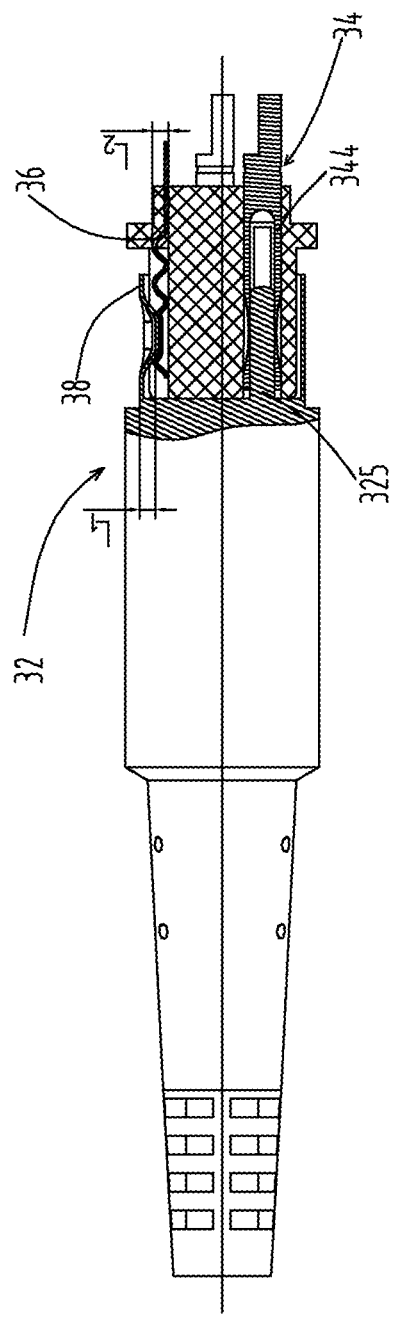
FIG. 9 is a partial cross-sectional view of the electric connector shown in FIG. 6a, where a male joint and a female joint are in a connected state.

As shown in FIG. 6a and FIG. 9, the keeping unit includes an elastic coupling part 36 disposed on the female joint 34 and an auxiliary coupling part 38 disposed on the male joint 32. The elastic coupling part 36 comprises a metal sheet structure, the structure shape may be in the shape of a wave, and the elastic coupling part is disposed on an outer surface of the rear part 341. The auxiliary coupling part 38 is a groove concaving inside from an outer surface of the first cylinder part 321. When the male joint 32 fits the female joint 34, in other words, the first cylinder part 321 is inserted to the rear part 341. The elastic coupling part 36 is clamped with the auxiliary coupling part 38 and deforms elastically under an action of the auxiliary coupling part 38.

In one embodiment described herein, as shown in FIG. 9, a distance L1 in which the auxiliary coupling part 38 recessed downward from an outer surface of the first cylinder part 321 is 1.1 mm, and a distance L2 between a crest and a tough of the elastic coupling part 36 is 1.3 mm. When the elastic coupling part 36 couples the auxiliary coupling part 38, the crest of the elastic coupling part 36 deforms to a nearly horizontal state, and the distance between the crest to the tough decreases to 0.7 mm, in other words, a deformation quantity of the crest is 0.6 mm. In this case, one end of the crest abuts against a first slope of the auxiliary coupling part 38, and the other end abuts against a second slope of the auxiliary coupling part 38. When the user needs to disconnect the male joint 32 from the female joint 34, the user needs to provide enough withdrawal force to enable the elastic coupling part 36 to further deform.

It may be considered that, a deeper distance that the auxiliary coupling part 38 is recessed downward indicates a larger force for separating the male joint 32 from the female joint 34. In this embodiment, a distance that the auxiliary coupling part 38 is recessed downward is in a range of 1.05 mm to 1.15 mm.

In any of the embodiments described herein, the elastic coupling part 36 may alternatively be disposed on the male joint 32, and the auxiliary coupling part 38 may be disposed on the female joint 34. This is not limited in this disclosure.

As described above, to prevent the male joint 32 and the female joint 34 from easily loosing, a keeping force maintaining the two at a connected state cannot be excessively small; and on the other hand, to satisfy rapid disassembly and installation, the keeping force maintaining the male joint 32 and the female joint 34 at a connected state cannot be excessively large. Therefore, the keeping force between the male joint 32 and the female joint 34 needs to be arranged within a reasonable range.

In this implementation, the keeping force between the male joint 32 and the female joint 34 is in a range of 55 N to 65 N. In other words, the user needs to provide an acting force greater than 55 N to separate the electric power tool 11 from the control device 12.

Certainly, the cable 23 may be detachably connected to the electric power tool 11 by using other manners. This disclosure is not limited to the described detachable connections.

In any of the embodiments described herein, the cable 23 may be independently disposed on the control device 12. In other words, one end of the cable 23 is detachably connected to the control device 12, and the other end of the cable 23 is detachably connected to the electric connector 30. The electric connector 30 described above may alternatively be disposed between one end of the cable 23 and the control device 12.

In one embodiment, the first control unit changes a working rotation speed of the motor 16 by controlling a working parameter of the motor 16 of the electric power tool 11. The working parameter includes, but is not limited to a voltage of the motor 16, a current of the motor 16, or a combination of the voltage and the current of the motor 16. The working parameter is not limited in this disclosure. The first control unit may be a circuit module including a single chip.

Moreover, in this embodiment, the first user operation unit includes the first switch 28 and the first adjustment switch 35. The first adjustment switch is a manual speed adjustment button 35. The manual speed adjustment button 35 is operated by the user to adjust a rotation speed of the motor 16.

Figure 2:
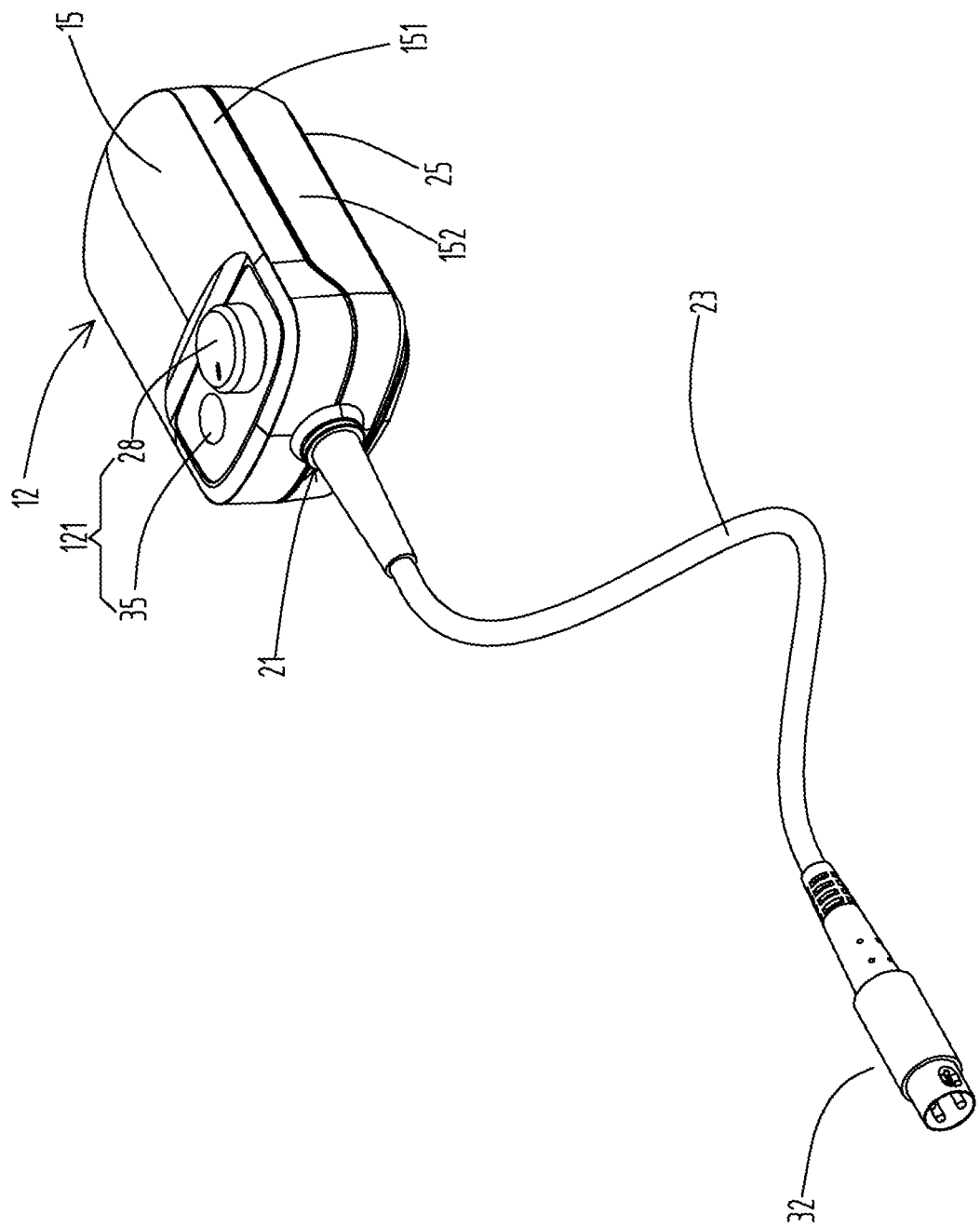
FIG. 2 is a schematic structural diagram of the control device according to an embodiment of the invention.

As shown in FIG. 2, the first switch 28 is disposed on the first shell 15 and is configured to control power transmission from the battery pack 27 to the electric power tool 11, so as to control on and off of the motor 16. When using the electric power tool 11, the user only needs to trigger the first switch 28 on the first shell 15, and the electric power flows from the battery pack 27 to the motor 16 by using the control device 12.

However, for some electric power tools, for example, the angle grinder in this embodiment, a working state of the motor 16 needs to be changed frequently. If a switch 28 for turning on and off the motor 16 is disposed on the control device 12, although a structure of the electric power tool 11 is simplified, it also brings inconvenience of operation to some extent. Because during a specific operation, the user only holds the electric power tool 11, and the control device 12 is disposed separately by using the cable 23. When a working state of the motor 16 needs to be changed, the user needs to go to a place in which the control device 12 is placed to operate the control device 12, so as to control the motor 16.

In view of this, in any of the embodiments described herein, the electric power tool 11 may further include a second user operation unit 111 operated by the user to control the electric power tool to work.

The second user operation unit 111 includes a second switch disposed on the second shell 18 and electrically connected to the second control unit 110. The second control unit 110 may control on or off of the working component 112 (the motor 16) according to an on/off state of the second switch. When the user holds the second shell 18, the on and off of the working component 112 may be controlled by controlling the second switch. The second switch may be a membrane switch. Certainly, the second switch is not limited to a membrane switch, or may be another switch, for example, a light sensing switch. The second switch type is not limited in this disclosure. During operation, the user first operates the first switch 28, and at this time, the battery pack 27 may perform power transmission on the electric power tool 11; and then the user operates the second switch to turn on the working component 112. The user only needs to operate the second switch to turn off the working component 112.

Certainly, the first switch and the second switch are respectively disposed on the first shell 15 and the second shell 18. In one embodiment, the power transmission from the battery pack 27 to the electric power tool 11 only occurs after the second switch is operated after the first switch is operated. In this case, the motor 16 may be stopped by only operating any one of the first switch and the second switch.

The second user operation unit 111 further includes a second adjustment switch. The second adjustment switch is disposed on the second shell 18, and the second adjustment switch may alternatively be a manual speed adjustment button for the user to manually operate. The second adjustment switch is electrically connected to the second control unit 110, and the second control unit 110 may generate the second adjustment signal according to an operation of the user on the second adjustment switch. The second control unit 110 may select one of the first adjustment signal and the second adjustment signal according to a preset priority to adjust the working parameter of the working component 112. For example, when a priority of the second adjustment signal is higher than a priority of the first adjustment signal, the second control unit ignores the first adjustment signal and adjusts the working parameter of the working component 112 according to the second adjustment signal; and when the priority of the first adjustment signal is higher than the priority of the second adjustment signal, the second control unit ignores the second adjustment signal and adjusts the working parameter of the working component 112 according to the first adjustment signal. When the electric power tool 11 is a miniaturized hand-held electric power tool, it is preferred that the priority of the second adjustment signal is higher than the priority of the first adjustment signal, which is convenient for the user to adjust the working parameter of the motor 16 when holding the electric power tool 11 by hand to operate.

According to the electric power tool system provided in the foregoing embodiment, by disposing the first adjustment switch 35 on the control device 12, the control device 12 may be adapted to an electric power tool 11 having no adjustment switch, or may be adapted to an electric power tool 11 having an adjustment switch, which may improve the adaptivity of the control device 12 and reduce the production cost of the electric power tool system. By disposing the second adjustment switch on the electric power tool 11, the user may adjust the working parameter of the working component 112 on the electric power tool 11, which is more convenient for a hand-held electric power tool to operate.

In one embodiment described herein, the second switch may be only disposed on the second shell 18 of the electric power tool 11. The second switch is configured to control on and off of the motor 16. When holding the second shell 18, the user may control the on and off of the motor 16 by using the second switch.

In this embodiment, as shown in FIG. 3, the control device 12 further includes two USB output interfaces 26, and the USB output interfaces 26 are disposed at a side of the control device 12. The USB output interfaces 26 output a target voltage to charge an external electric power device, for example, a mobile phone. Therefore, the first control unit further includes a voltage conversion module configured to convert a supply voltage of the battery pack 27 into the target voltage.

A size of the target voltage is set according to a requirement of an external device. In one embodiment, the USB output interfaces 26 may output an electric power with a target voltage value of 5 V and a current of 1 A.

For security reasons, the control device 12 may be further provided with an operation button. When the control device 12 is connected to the battery pack 27 by using the battery pack mounting part 25, the user needs to operate the operation button first to supply power for an external device by using the USB output interfaces 26.

When the control device 12 is connected to the battery pack 27 and supplies power for the external device by using the USB output interfaces 26, the control device 12 may be also connected to the electric power tool 11 by using the cable 23 at the same time to supply power for the electric power tool 11, so as to control the electric power tool to work. Certainly, the control device 12 may supply power for one of the external device and the electric power tool 11.

To be adapted to interface types of different external devices, the control device 12 may alternatively be provided with other types of output interfaces, for example, a TYPE-C interface or a combination of a USB interface and a TYPE-C interface. The interface types are not limited in this disclosure.

In one embodiment, as shown in FIG. 2, the battery pack mounting part 25 is disposed on the first shell 15. Specifically, the battery pack mounting part 25 is disposed at a lower side of the first shell 15, and the battery pack mounting part 25 is slidably engaged with the battery pack 27. When the battery pack 27 is connected to the battery pack mounting part 25 and the control device 12 is connected to the electric power tool 11 by using the cable 23, the battery pack 27 forms a loop with the first control unit and the motor 16, and therefore, the battery pack 27 can provide electric power to the motor 16. In this case, the control device 12 enables the battery pack 27 and the electric power tool 11 to be separated. In other words, the control device 12 enables the battery pack 27 to be disposed outside relative to the electric power tool 11. Further, compared with the electric power tool in the related art, the electric power tool according to the embodiments disclosed herein have a smaller volume, the operation is more convenient, and man-machine experience is better.

In this implementation, a battery capacity of the battery pack 27 is 2 AH.

In one embodiment described herein, as shown in FIG. 3, the control device 12 further includes the battery pack 27 configured to be connected to the battery pack mounting part 25.

In any of the embodiments described herein, the first control unit may further include a temperature detection module and an overload protection module. Specifically, the temperature detection module is configured to detect a working temperature of the first control unit. The overload protection module is configured to cut off power supply or switch a working mode of the motor 16 when a working current of the first control unit exceeds a preset value.

A brushless motor has a strong load capacity, and at the same power, a brushless motor has a smaller structure size than that of a brush motor. In view of this, the electric power tool in this implementation adopts a brushless motor as a driving source. A diameter D1 of the brushless motor is in a range of 17 mm to 28 mm. Further, a diameter of the brushless motor is not greater than 25 mm.

Therefore, compared with an electric power tool powered by a battery pack of 2 AH battery capacity, the electric power tool provided in this implementation of this application has a smaller motor size and even a smaller structure size. Compared with an electric power tool with a small structure size, the electric power tool according to this implementation of this application can be powered by a battery pack with a larger capacity.

Certainly, a brush motor may alternatively be selected as a driving source according to working characters of different electric power tools.

In embodiments described herein, a brushless motor may be an external rotor brushless motor.

The angle grinder of one embodiment is shown in FIG. 5. An output shaft of this electric power tool outputs a rotation motion, to drive a work head 45 to complete a specific operation. For example, the angle grinder is used to cut or polish fiber reinforce plastic (FRP) and other workpieces. The motor 16 adopts an external rotor brushless motor.

A shell 18 includes a first cylinder part 17 and a second cylinder part 19 configured to receive the motor 16 and a transmission mechanism 14. The second cylinder part 19 is constructed as a handle for a user to grasp. The first cylinder part 17 includes a motor shell 170 configured to receive the motor 16 and a transmission shell 171 configured to receive the transmission mechanism 14. In addition, a radial dimension of the transmission shell 171 is less than a radial dimension of the motor shell 170. The first cylinder part 17 is roughly arranged in a vertical direction, and the second cylinder part 19 is roughly arranged in a horizontal direction.

Because the control unit and the power supply are disposed independent of the electric power tool 11, a structure size of the electric power tool 11 is miniaturized. In this embodiment, a size L6 of the second cylinder part 19 in a horizontal direction is in a range of 80 mm to 150 mm. In other words, when the user holds the second cylinder part 19, a hand of the user holds a large portion of the second cylinder part 19. In addition, to ensure good holding experience, a radial dimension of the second cylinder part 19 is to be set within a reasonable range. In this embodiment, a diameter D2 of the second cylinder part 19 is in a range of 25 mm to 41 mm, and a ratio of a battery capacity to a holding size is in a range of 2/25 to 2/41.

As shown in FIG. 5, during cutting of the angle grinder, a part on which a cutting operation is actually performed is a part of the work head 45 exceeding an outer wall of the transmission shell 171. In other words, in a case that a radial dimension of the work head 45 is relatively fixed, a larger distance L7 between a motor axis X1 and the outer wall of the transmission shell 171 indicates a smaller thickness of the workpiece that can be cut by the work head 45. In this embodiment, the distance L7 between the motor axis X1 and the outer wall of the transmission shell 171 is in a range of 10 mm to 18 mm.

Figure 10:
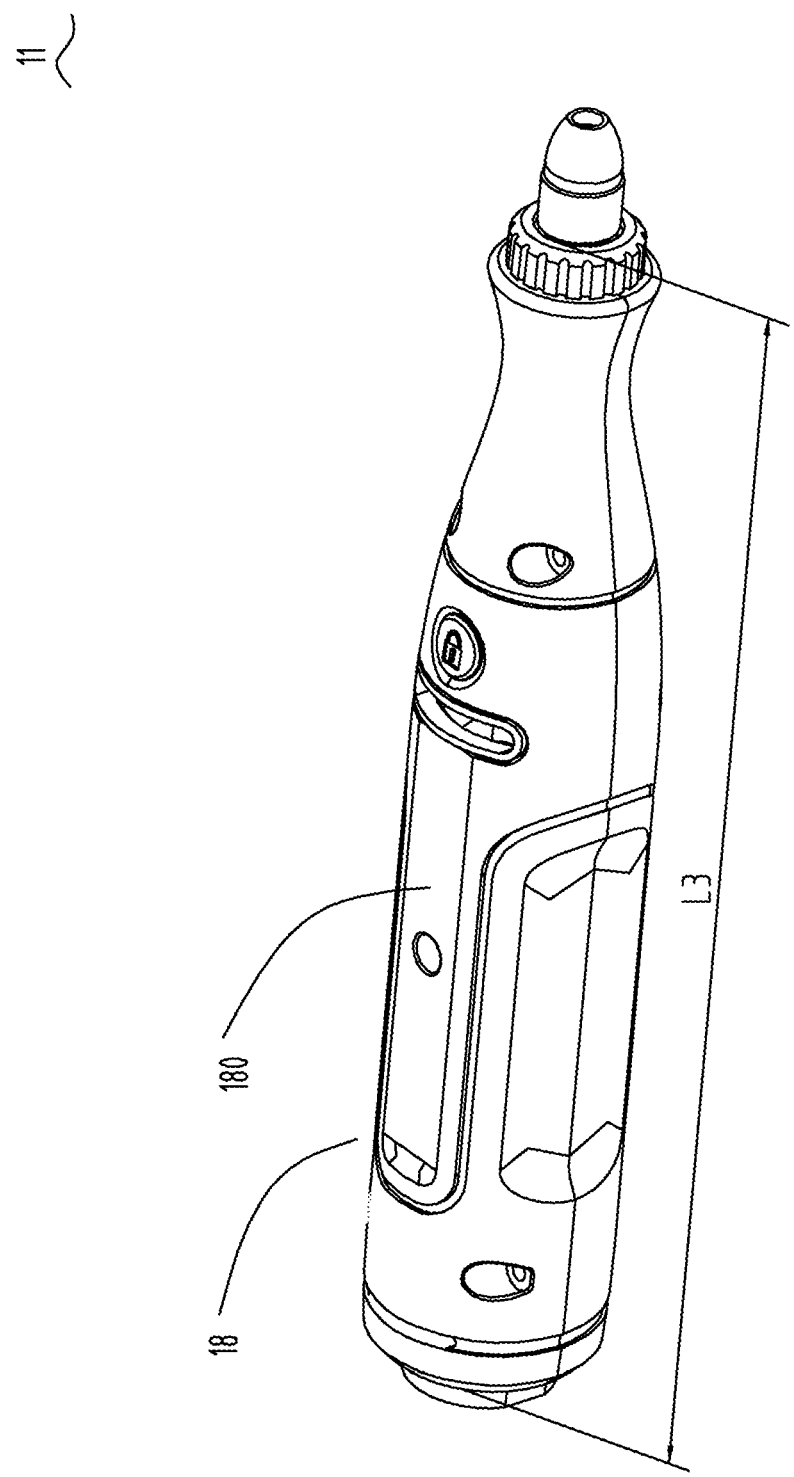
FIG. 10 is a schematic structural diagram of the electric power tool in the electric power tool system when the electric power tool is a straight grinder according to another embodiment of the invention.
Figure 11:
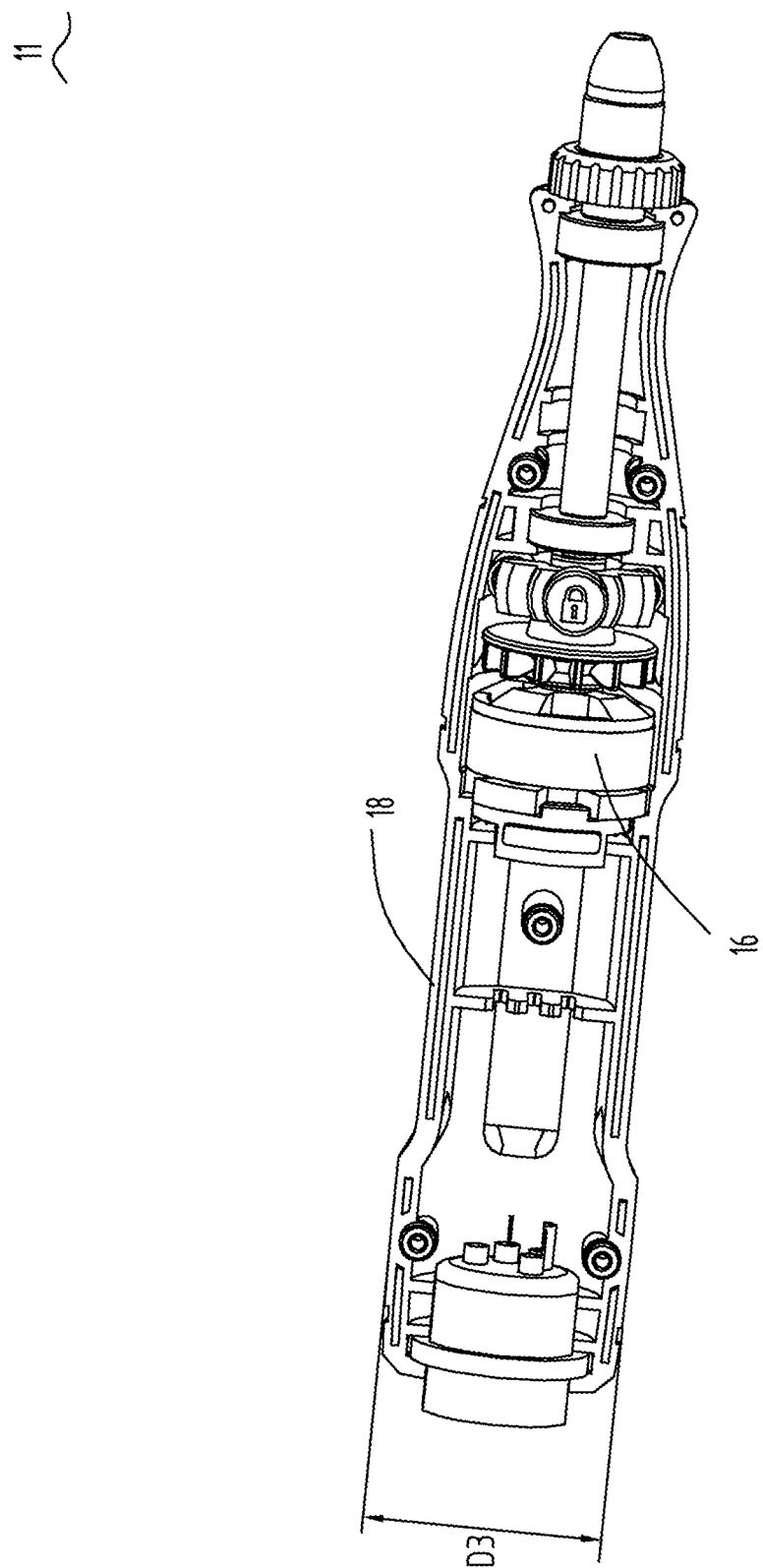
FIG. 11 is a schematic structural diagram of the straight grinder shown in FIG. 10 of which a half shell is removed.

As shown in FIG. 10 and FIG. 11, when the electric power tool 11 is an electric power tool having a motor, the electric power tool 11 may alternatively be a straight grinder. Similar to the angle grinder, an output shaft of the straight grinder also outputs a rotation motion, to drive a work head to complete a specific operation. For example, surface grinding of workpiece and other works are performed by using the straight grinder.

The second shell 18 of the straight grinder 11 is a cylinder shell extending in a longitudinal direction, which provides a holding part 180 for the user to grasp, and the shell 18 receives the motor 16 inside. One end of the second shell 18, opposite to the work head is provided with the second interface 22 to be connected to the cable 23.

The straight grinder selects a brushless motor as a driving source, and a diameter D3 of the holding part 180 is in a range of 23 mm to 34 mm. A size L3 of the shell 18 in a longitudinal direction is in a range of 120 mm to 180 mm.

Figure 12:
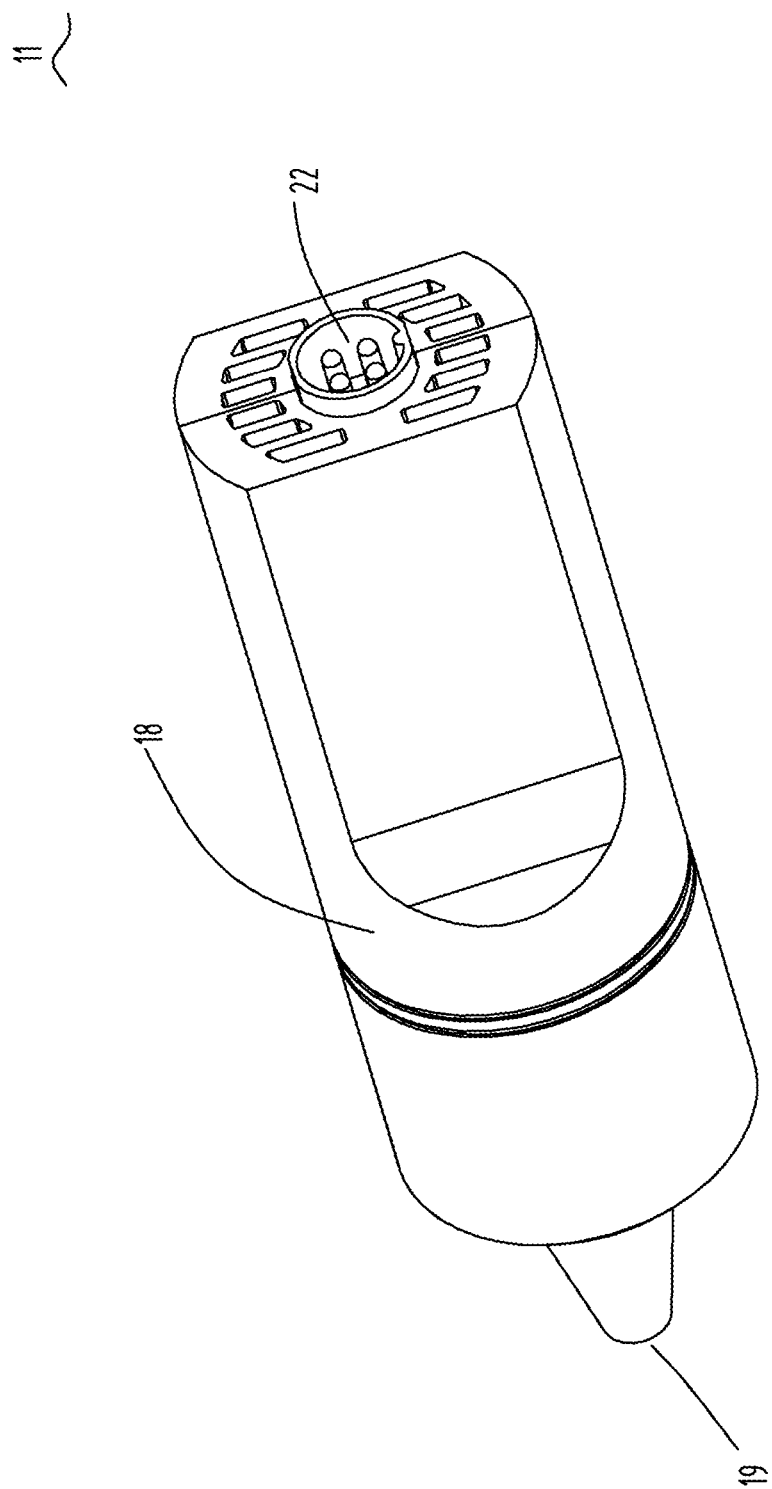
FIG. 12 is a schematic structural diagram of the electric power tool in the electric power tool system, when the electric power tool is a hair dryer according to another embodiment of the invention.
Figure 13:
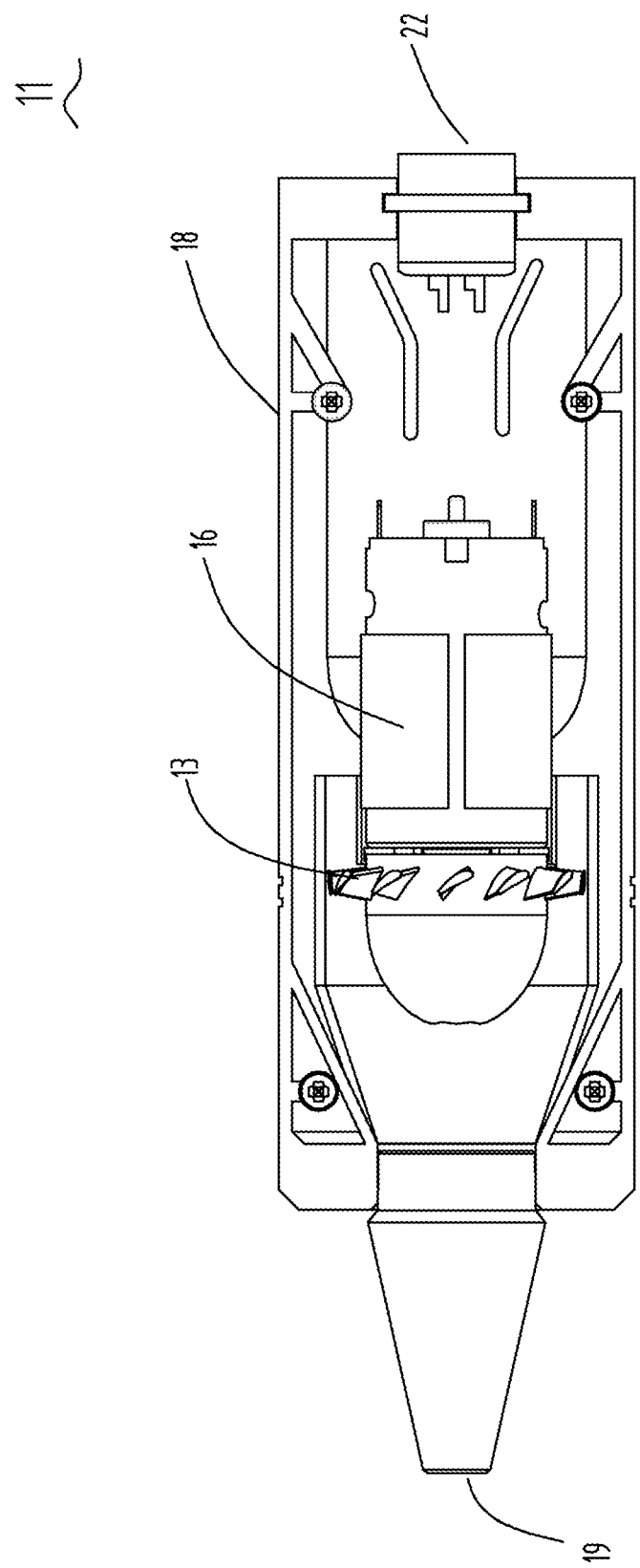
FIG. 13 is a schematic structural diagram of the hair dryer shown in FIG. 12 of which a half shell is removed.

For example, as shown in FIG. 12 and FIG. 13, the electric power tool 11 may alternatively be a hair dryer. A working form of the hair dryer is to output an airflow to outside. The second shell 18 of the hair dryer is provided with an air outlet 19, and the second shell 18 is further provided with the motor 16 and a fan 13 inside. The fan 13 is driven by the motor 16 to rotate, to generate an airflow. The other end, of the second shell 18, opposite to the air outlet is provided with the second interface 22 to be connected to the cable 23.

In any of the embodiments described herein, the fan 13 may be a centrifugal fan.

In one embodiment, the hair dryer is not provided with the second user operation unit, and if the hair dryer needs to adjust a speed, the hair dryer may be controlled by the first user operation unit on the control device 12.

Figure 14:
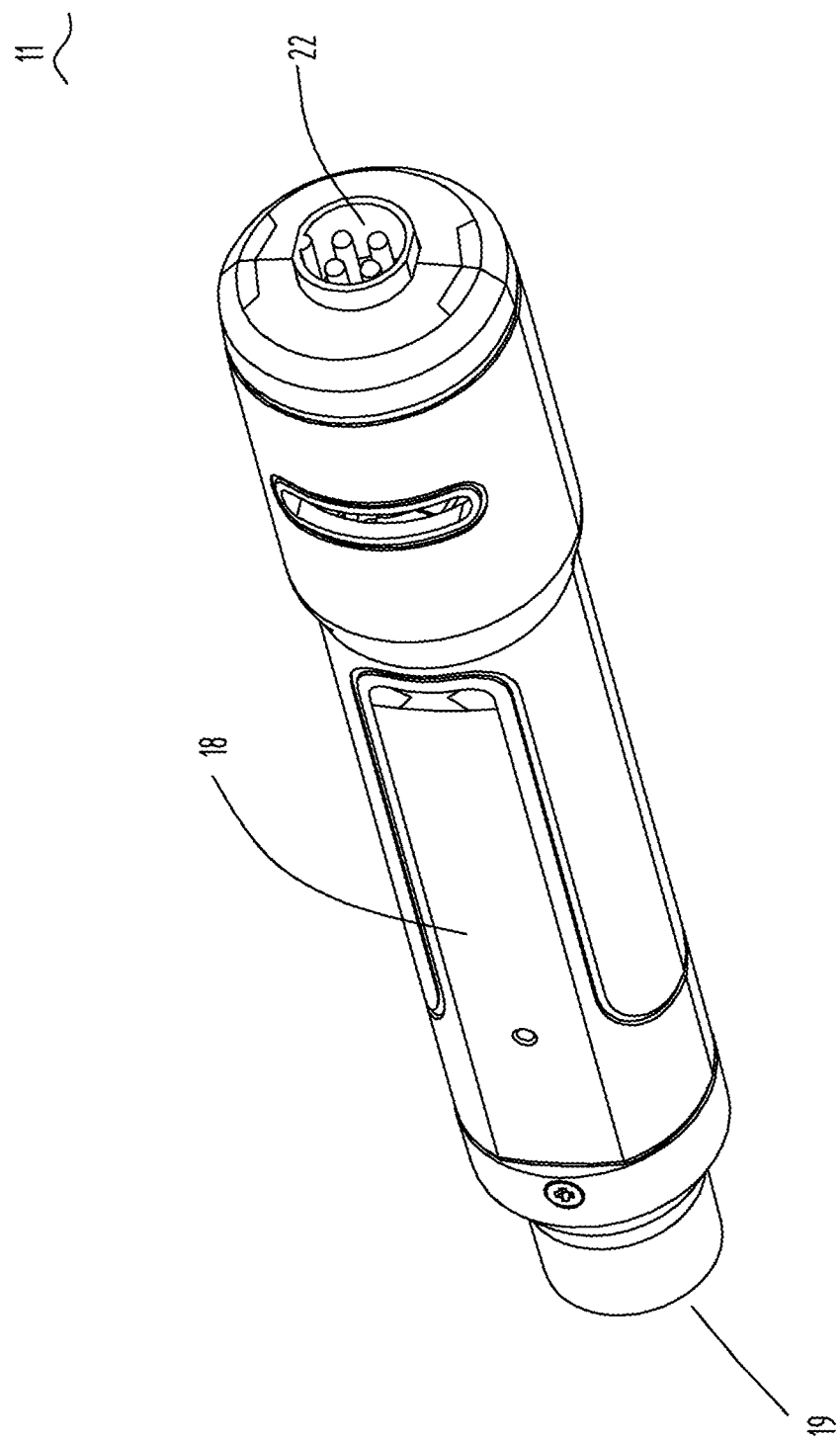
FIG. 14 is a schematic structural diagram of the electric power tool in the electric power tool system, when the electric power tool is a heat gun according to another embodiment of the invention.
Figure 15:
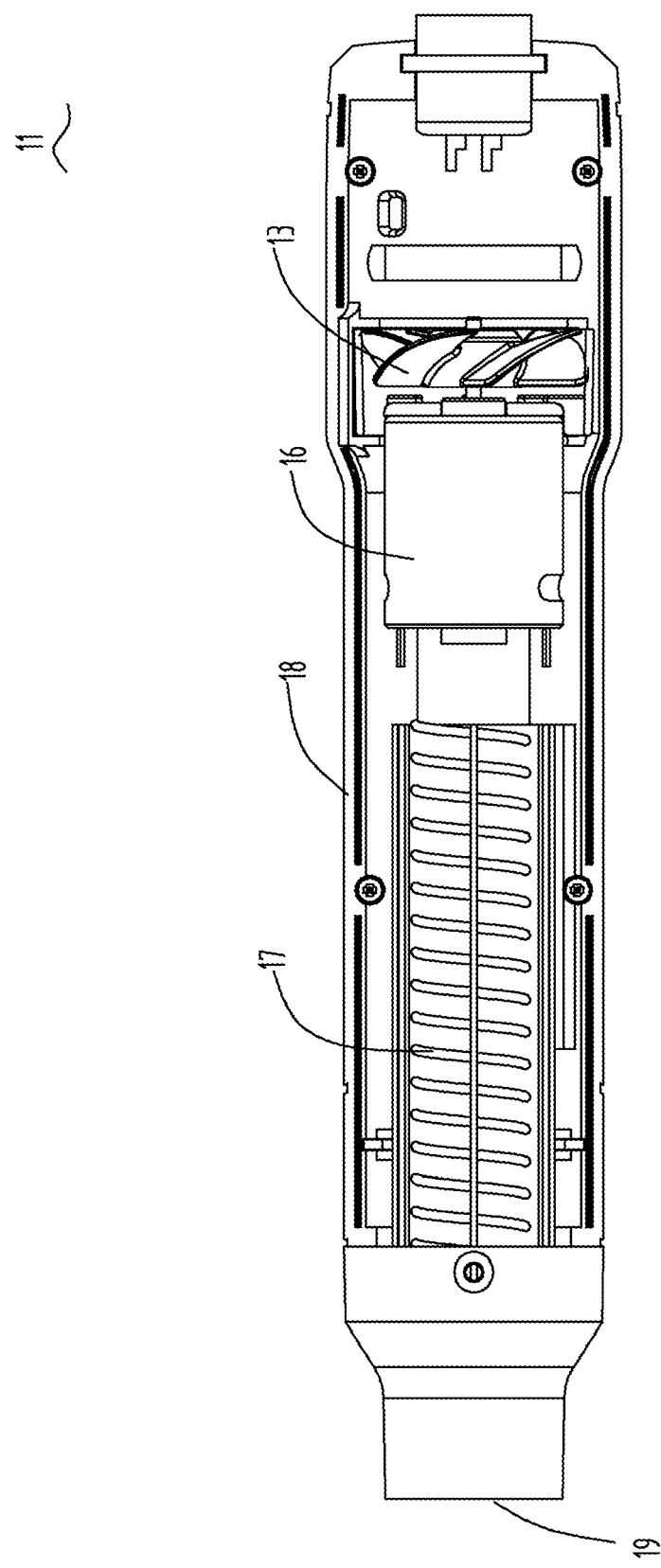
FIG. 15 is a schematic structural diagram of the heat gun shown in FIG. 14 of which a half shell is removed.

As shown in FIG. 14 and FIG. 15, the electric power tool 11 is a heat gun. A working form of the heat gun is to output hot wind to outside. The second shell 18 is provided with the air outlet 19, and the second shell 18 is further provided with the motor 16, a resistance wire 17, and the fan 13 inside. The fan 13 is driven by the motor 16 to rotate to generate an airflow. The resistance wire 17 receives an electric heat from battery pack 27 and heats the airflow generated by the fan 13. In a flowing path of the airflow, the resistance wire 17 is closer to the air outlet 19 than the fan 13 is. In this case, the airflow generated by the fan 13 can be heated by the resistance wire 17 when flowing through the air outlet 19. The heat gun selects a brush motor as a driving source.

The electric power tools such as the straight grinder and the angle grinder described above complete specific operations by driving the work head using the motor 16, and an electric power of the battery pack 27 is mainly used for driving the motor 16 to rotate. However, in the heat gun, in addition to driving the motor 16 and the fan to rotate to generate an airflow, the electric power of the battery pack 27 further needs to be provided to the resistance wire 17 for heating the resistance wire. It is to be noted that, the electric power provided by the battery pack 27 to the resistance wire 17 is also transmitted by the conductor wire 232 supplying power for the motor 16.

In this embodiment, the electric power tool 11 may not be provided with the second control unit and the second user operation unit, and the electric power tool 11 is controlled to turn on and off by using the first user operation unit 121 disposed on the control device 12. A function implemented by the control device 12 is power transmission, and other functions such as controlling a rotation speed is not related. However, if the heat gun needs to adjust a temperature and a wind speed, herein, the working component includes a motor and a resistance wire.

When the electric power tool 11 is a heat gun, the shell 18 is further provided with a temperature protection module inside. When a temperature of the airflow is higher than a preset temperature, the temperature protection module works to cut off the electric power transmitted to the motor 16 and the resistance wire 17.

In the foregoing embodiment, the working component 112 of the electric power tool is the motor 16, and the second control unit 110 may be connected to the first adjustment switch 35 or the second adjustment switch by using the cable 23, and adjusts a rotation speed and voltage of the motor according to a signal of the first adjustment switch 35 or the second adjustment switch.

In another embodiment, the working component 112 includes a heating wire, in other words, the electric power tool 11 is an electric power tool having no motor. The electric power tool 11 having no motor may be an electric soldering iron or the like. A working parameter of the working component 112 includes a temperature of the heating wire.

Figure 16:
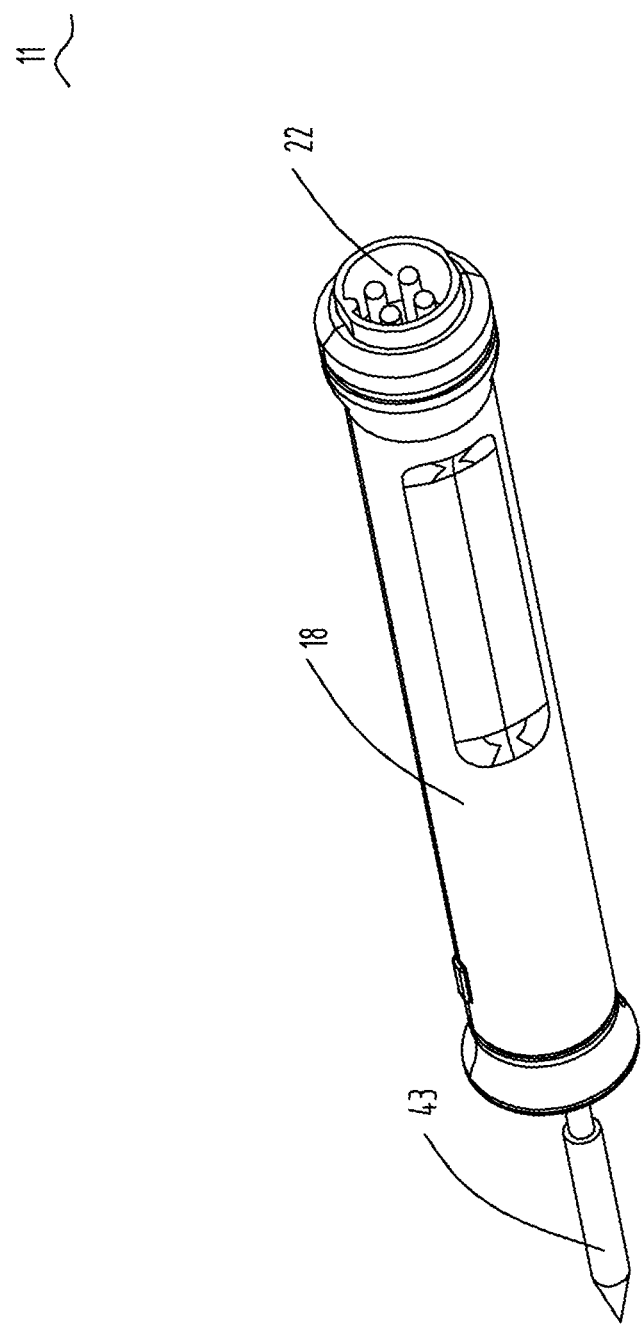
FIG. 16 is a schematic structural diagram of the electric power tool in the electric power tool system, when the electric power tool is an electric soldering iron according to another embodiment of the invention.
Figure 17:
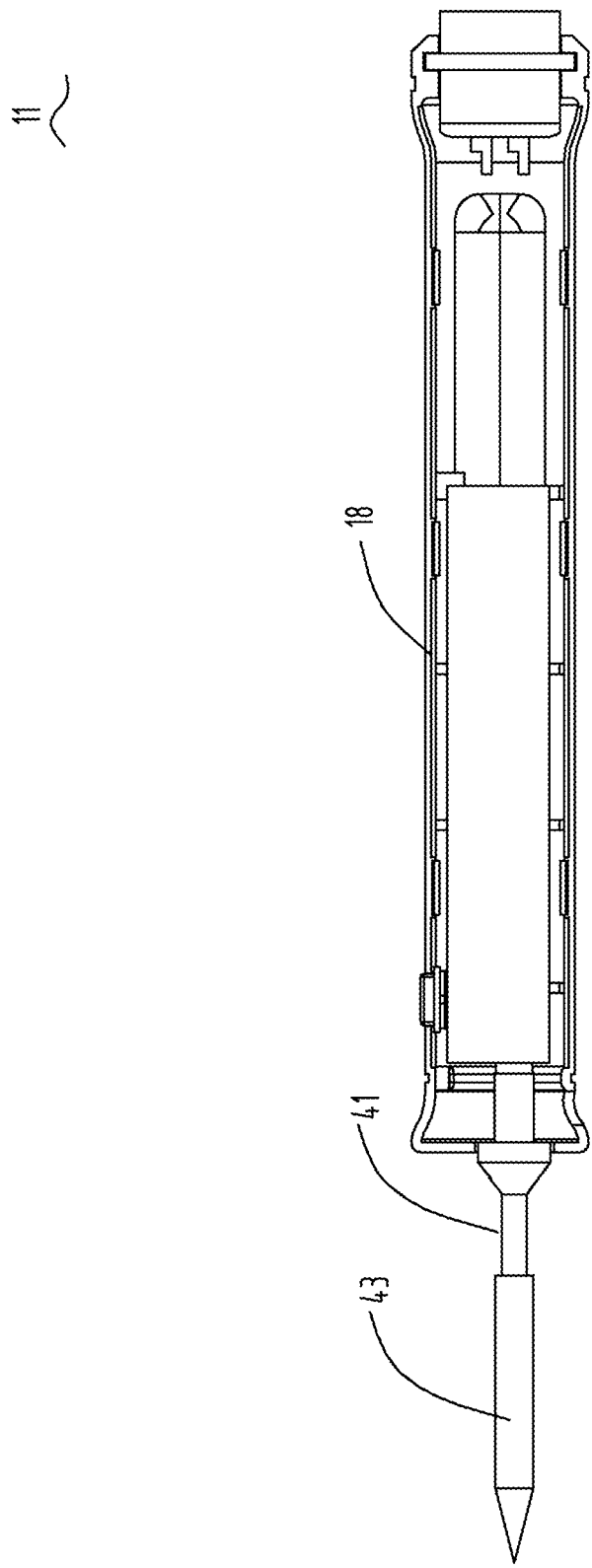
FIG. 17 is a schematic structural diagram of the electric soldering iron shown in FIG. 16 of which a half shell is removed.

As shown in FIG. 16 and FIG. 17, the electric power tool 11 may alternatively be an electric power tool having no motor, for example, an electric soldering iron. An electric soldering iron 11 is mainly configured to weld elements and wires. Therefore, the electric soldering iron 11 is mainly provided with a soldering iron core 41 and a solder tip 43. The soldering iron core 41 includes a heating wire. The soldering iron core 41 is located inside the second shell 18 and configured to receive an electric heat of the battery pack 27, and the solder tip 43 is disposed at one end of the shell 18 and configured to weld. Different from the foregoing power tools, the shell 18 of the electric soldering iron 11 is provided with no motor inside.

When the control device 12 is connected to the battery pack 27 and the cable 23 is connected to the electric soldering iron 11, an electric power of the battery pack 27 is transmitted to the soldering iron core 41 to heat the electric soldering iron.

In this embodiment, when the connected electric power tool is an electric soldering iron, a function implemented by the control device 12 is power transmission, and other functions such as controlling a rotation speed is not related.

In one embodiment described herein, the second shell 18 of the electric soldering iron 11 is further provided with a second control unit inside for temperature control. The second shell 18 is further provided with a temperature selection button for the user to select a temperature according to actual requirements.

In any of the embodiments described herein, the first adjustment switch 35 or the second adjustment switch may be a temperature selection button, and after the first adjustment switch 35 or the second adjustment switch is electrically connected to the second control unit 110, the second control unit 110 may adjust a temperature of the soldering iron core 41 according to a signal.

In the electric power tool system provided in the foregoing embodiment, the battery pack may be adapted to an electric power tool having a motor, or may be adapted to an electric power tool having no motor, which may improve the adaptivity of the control device 12 and reduce the production cost of the electric power tool 11.

In any of the embodiments described herein, the first control unit 120 may determine a working state of the battery pack 27 by detecting at least one of parameters of a voltage, a current, and a temperature of the battery pack 27. When the battery pack 27 is abnormal, the first control unit 120 cuts off the power transmission from the battery pack to the electric power tool 11, to protect the electric power tool 11 from damage.

In any of the embodiments described herein, the electric power tool 11 may further include an over-current protection unit, configured to measure a value of a current flowing into the motor or the heating wire (in other words, the working components), and when the value of the current flowing into the motor or the heating wire is greater than or equal to a predetermined current value, the second control unit 110 controls the motor or the heating wire (in other words, the working component) to stop working.

In any of the embodiments described herein, the first user operation unit 121 of the control device may include an indication module, configured to instruct the user to complete required operations.

In any of the embodiments described herein, the control device may further include a display module, configured to display related information of the battery pack or related information of the control device, for example, a voltage, remaining power, and a charging notification of the battery pack, or a model and a power supply voltage of the control device.

As can be seen from the foregoing solutions that, according to the electric power tool system provided in embodiments of the invention, by disposing the external control device 12 having the battery pack mounting part 25, the electric power tool 11 is not required to be provided with a power supply for supplying an electric power for the working component 112. In other words, the power supply is separated from the electric power tool 11. In this case, on the one hand, the volume and the weight of the electric power tool 11 are reduced. On the other hand, when holding the second shell 18 to operate the electric power tool 11, the control device 12 may be disposed aside, and the user does not need to carry the control device. In addition, in the electric power tool system 10 provided in the embodiments of this disclosure, the electric power tool 11 is separated from the battery pack mounting part 25, and the electric power tool 11 has a small structure size and a light weight, which is easier to hold. In addition, the control device 12 in the electric power tool system 10 may be used in a plurality of electric power tools 11, may be adapted to an electric power tool 11 having a motor or may be adapted to an electric power tool 11 having no motor; may be adapted to an electric power tool 11 having a speed adjustment function, or may be adapted to an electric power tool 11 having no speed adjustment function; and may be adapted to an electric power tool 11 having a control unit, or may be adapted to an electric power tool 11 having no control unit. In this case, not only the adaptivity of the control device 12 can be improved, but also the production cost of the electric power tool 11 can be reduced. In addition, the electric power tool 11 in the electric power tool system 10 according to some embodiments adopts a brushless motor 16, and therefore, the efficiency is higher.

In one embodiment described herein, as shown in FIG. 3, this disclosure further provides a controller, including the control device 12 and the electric connector 30. The electric connector includes a male joint disposed on one of the control device and the electric power tool, and a female joint disposed on the other one of the control device and the electric power tool. The male joint is configured to couple the female joint. In addition, the male joint or the female joint is fixedly connected to the control device by using a cable or directly fixedly connected to the control device.

One embodiment of this invention provides an electric power tool system, including a control device and an electric power tool. The control device includes a first shell, a first control unit, a battery pack mounting part, and a first interface. The first control unit is disposed inside the first shell and configured to control a working parameter of a motor of the electric power tool when the electric power tool is connected to the control device. The battery pack mounting part is disposed on the first shell and configured to be connected to a battery pack. The battery pack is configured to provide an electric power to the motor. The electric power tool includes a second shell, a motor disposed inside the second shell, and a second interface disposed on the second shell. The second interface is electrically connected to the motor. When the first interface is connected to the second interface by using a cable, the first control unit is electrically connected to the motor.

During operation, a user may hold the second shell to operate the electric power tool, and the control device may be disposed aside, so that the user does not need to carry the control device.

As can be seen from the foregoing solutions that, according to the electric power tool system provided in this embodiment, by disposing an external control device having a first control unit and a battery pack mounting part, the electric power tool is not required to be provided with a first control unit configured to control a working parameter of the motor inside; and the electric power tool is not required to be provided with a power supply configured to provide an electric power to the motor. In other words, the first control unit, the power supply, and the electric power tool are separated. In this case, on the one hand, the volume and the weight of the electric power tool are reduced. On the other hand, when holding the second shell to operate the electric power tool, the control device may be disposed aside, and the user does not need to carry the control device. In addition, in the electric power tool system provided in this embodiment, the electric power tool, the control unit, and the battery pack mounting part are separated, and the electric power tool has a small structure size and a light weight, which is easier to hold. Moreover, the electric power tool with a small structure size is powered by a battery pack of 2 AH battery capacity and has a longer battery life.

In any of the embodiments described herein, the control device in the electric power tool system may be configured to control the working component of the electric power tool, and the electric power tool is provided with no control unit. In such embodiments, a function implemented by the control device is power transmission, and other functions such as controlling a rotation speed is not related.

In any of the embodiments described herein, the control device in the electric power tool system may be configured to control the working component of the electric power tool, and the electric power tool is provided with no control unit. The first control unit includes a recognition module configured to recognize a type of an electric power tool connected to the control device, so as to select a working parameter matching the electric power tool. In a further embodiment, the cable is provided with five conductor wires inside. Correspondingly, an inserting interface is provided with five inserting grooves, and a connection terminal is provided with five cylindrical projections. The three conductor wires are configured for power transmission from the battery pack to the motor, and the other two conductor wires are configured to recognize a function service.

In another embodiment described herein, the first control unit may be configured to control the battery and the working component of the electric power tool, the first control unit includes a recognition module, and the recognition module is configured to recognize a type of an electric power tool connected to the control device, so as to select a working parameter matching the electric power tool. Specifically, the first control unit has a recognition function. When the control device is connected to the electric power tool by using the cable, the first switch is pressed, and the first control unit is powered to work. The first control unit first recognizes a type of an electric power tool connected to the control device; then the first control unit selects a working parameter of a motor matching the electric power tool, and transmits an electric power corresponding to the working parameter to the electric power tool by using the cable.

Specifically, a recognition resistance may be set by an electric power tool. For different types of electric power tools, resistance values of the recognition resistance set therefor may also be different. When an electric power tool is electrically connected to a control device by using a cable, the first control unit obtains a resistance value of the recognition resistance, determines a type of the electric power tool according to the resistance value, and selects a working parameter matching the electric power tool to control the electric power tool to work.

The first control unit may further recognize a type of a motor of the electric power tool connected to the control device, so as to select a working parameter matching the motor.

In a possible embodiment, a circuit board may be disposed inside the electric power tool, which is configured for information transmission with the first control unit and to implement a recognition function of the control device. When the control device is connected to the electric power tool by using the cable, the user presses the switch; and both the first control unit and the circuit board are powered to work. The first control unit transmits a recognition signal to the circuit board by using one of the foregoing conductor wires. After receiving the recognition signal, the circuit board transmits an identity signal that can represent a tool type or a motor type to the first control unit by using another conductor wire. After receiving the identity signal, the first control unit determines a type of the electric power tool connected to the control device and a motor type, so as to control the electric power tool to work.

In an embodiment described herein, the first control unit may recognize a type of an electric power tool by using a wireless communication manner, for example, by using a Bluetooth technology. Specifically, the first control unit is provided with a first wireless module; and correspondingly, the electric power tool is provided with a second wireless module. When the control device is connected to the battery pack and the control device is connected to the electric power tool by using the cable, the first switch is pressed. The control device and the electric power tool jointly receive an electric power from the battery pack, so that the first wireless module and the second wireless module are powered to work. The second wireless module transmits a wireless signal that can represent identity information of the electric power tool, and the first wireless module receives the signal and feeds back to the first control unit. The first control unit determines a type of the electric power tool connected to the control device according to the received wireless signal, and finally selects a working parameter of a motor matching the electric power tool.

It is to be noted that, in the descriptions of this application, terms "first" and "second" are only used to describe the objective and distinguish similar objects without a limitation on a sequence between the two, and cannot be understood as indicating or implying relative importance. In addition, in the description of this application, unless otherwise stated, "a plurality of" means two or more than two.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of the present invention, and their description is specific and detailed, but cannot therefore be understood as a limitation to the patent scope of the present invention. It should be noted that a person of ordinary skill in the art may further make several variations and improvements without departing from the concept of the present invention, and these variations and improvements all fall within the protection scope of the present invention. Therefore, the protection scope of the patent of the present invention is subject to the appended claims.

What is claimed is:

1. An electric power tool system comprising:
   a control device used for coupling an electric power tool to a battery pack, the control device being separate from the electric power tool and the battery pack,
   wherein the control device comprises:
     a shell configured to be connected to a battery pack mounting part of the battery pack,
     a control unit provided in the shell and configured to:
       control the battery pack to discharge energy stored therein,
       recognize a type of the electric power tool,
       select a working parameter matching a working component of the electric power tool, and
       adjust the working parameter,
     a user operation unit to control the electric power tool, and
     an interface electrically connected to the user operation unit.

2. The electric power tool system according to claim 1, wherein the user operation unit comprises a switch configured to permit or prohibit power transmission from the battery pack to the electric power tool.

3. The electric power tool system according to claim 2, wherein:
   the electric power tool system further comprises the electric power tool,
   the shell is a first shell,
   the control unit is a first control unit,
   the interface is a first interface,
   the electric power tool includes:
     a second shell,
     the working component,
     a second control unit provided in the second shell and configured to control the working component, and
     a second interface electrically connected to the second control unit, and
   the second control unit controls the working parameter of the working component according to an internally stored preset control instruction.

4. The electric power tool system according to claim 3, wherein:
   the second control unit enables or disables the working component, and/or
   the second control unit adjusts the working parameter of the working component.

5. The electric power tool system according to claim 1, wherein the working component comprises a motor, an electric heating wire, or a resistance wire.

6. An electric power tool system comprising:
   an electric power tool; and
   a control device coupling the electric power tool to a battery pack to provide electric power to the electric power tool,
   wherein the control device comprises:
     a first shell,
     a first control unit provided in the first shell, the first shell configured to be connected to a battery pack mounting part of the battery pack,
     a user operation unit to control the electric power tool, and
     a first interface electrically connected to the user operation unit;
   wherein the electric power tool comprises:
     a second shell,
     a working component,
     a second control unit disposed in the second shell and configured to control the working component, and
     a second interface electrically connected to the second control unit;
   wherein the battery pack mounting part comprises a pair of guide rails, and the battery pack is able to slide along the pair of guide rails to be engaged or disengaged with the control device;
   wherein the first interface is connected to the second interface via a cable, thus electrically connecting the electric power tool to the control device; and
   wherein the second control unit is electrically connected to the user operation unit via the cable, is configured to obtain an operation on the user operation unit and controls the working component according to the user operation unit.

7. The electric power tool system according to claim 6, wherein the user operation unit comprises an adjustment switch, and the second control unit detects an operation on the adjustment switch via the cable and generates an adjustment signal for adjusting a working parameter of the working component.

8. The electric power tool system according to claim 7, wherein the cable comprises three wires, two of the three wires being conductor wires configured for power transmission from the battery pack to the electric power tool, and one of the three wires being a signal wire configured to electrically connect the second control unit to the adjustment switch.

9. The electric power tool system according to claim 7, wherein the second control unit adjusts the working parameter of the working component according to the adjustment signal or controls the working component according to an internally stored preset control instruction.

10. The electric power tool system according to claim 7, wherein the second control unit controls the working parameter of the working component.

11. The electric power tool system according to claim 10, wherein the second control unit controls an on and off configuration of the working component.

12. The electric power tool system according to claim 10, wherein:
the adjustment signal is a first adjustment signal, and
the second control unit generates a second adjustment signal and selects one of the first adjustment signal and the second adjustment signal according to a preset priority to adjust the working parameter of the working component.

13. A control device configured to selectively couple one of at least two types of electric power tools, each of the at least two types of electric power tools comprising a second control unit, the control device comprising:
a shell;
a battery pack mounting part on the shell, the battery pack mounting part comprising a pair of guide rails configured to be detachably connected to a battery pack such that the battery pack is slidable along the pair of guide rails, whereby the battery pack is engageable with the control device;
a control unit disposed in the shell and configured to detect at least one of parameters of a voltage, a current, and a temperature of the battery pack to determine a working state of the battery pack, and to cut off power transmission from the battery pack to an electric power tool when the battery pack is abnormal; and
an interface electrically connected to the electric power tool via a cable, the control device transmitting electric energy to the electric power tool via the interface,
wherein a respective electric power tool of the at least two types of electric power tools is configured to measure a value of a current flowing into a working component and to stop an output of the working component when a current value is greater than a predetermined current value.

14. A control device configured to couple an electric power tool to a battery pack, the electric power tool comprising a working component and a first interface, wherein the control device comprises:
a shell;
a battery pack mounting part on the shell, the battery pack mounting part comprising a pair of guide rails configured to be detachably connected to the battery pack such that the battery pack is slidable along the pair of guide rails, whereby the battery pack is engageable with the control device;
a first control unit disposed in the shell and configured to detect at least one of parameters of a voltage, a current, and a temperature of the battery pack to determine a working state of the battery pack, and to cut off power transmission from the battery pack to the electric power tool when the battery pack is abnormal;
a user operation unit; and
a second interface electrically connected to the user operation unit, the second interface being connected to the first interface of the electric power tool, via a cable, such that the electric power tool is electrically connected to the control device to control the working component according to an operation on the user operation unit,
wherein the electric power tool further comprises a second control unit electrically connected to the user operation unit via the cable to obtain an operation on the user operation unit.

15. The electric power tool system according to claim 1, wherein:
the electric power tool system further comprises the battery pack, and
the battery pack mounting part comprises a pair of guide rails such that the battery pack slides along the pair of guide rails to be engaged or disengaged with the control device.

16. The electric power tool system according to claim 3, wherein the first interface is connected to the second interface via a cable, so that the electric power tool is electrically connected to the control device.

* * * * *